United States Patent
Suzuki

(10) Patent No.: US 8,543,780 B2
(45) Date of Patent: Sep. 24, 2013

(54) METHOD OF VERIFYING SYSTEM PERFORMANCE AND PERFORMANCE MEASUREMENT APPARATUS

(75) Inventor: Shintarou Suzuki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 272 days.

(21) Appl. No.: 13/189,697

(22) Filed: Jul. 25, 2011

(65) Prior Publication Data
US 2012/0047336 A1   Feb. 23, 2012

(30) Foreign Application Priority Data
Aug. 19, 2010 (JP) ................. 2010-183787

(51) Int. Cl.
*G06F 12/00* (2006.01)
(52) U.S. Cl.
USPC ........................................... 711/155
(58) Field of Classification Search
None
See application file for complete search history.

(56) References Cited

U.S. PATENT DOCUMENTS
| | | | |
|---|---|---|---|
| 7,725,795 B2 | 5/2010 | Sugano | |
| 2008/0059858 A1 | 3/2008 | Sugano | |

FOREIGN PATENT DOCUMENTS
| | | |
|---|---|---|
| JP | 2008-59338 A | 3/2008 |
| JP | 2008-191837 A | 8/2008 |

OTHER PUBLICATIONS
Device for Collection of Highly Detailed Statistics Cocerning Usage of I/O Devices, Dixon JD et al, IBM Techincal Disclosure Bulletin, Feb. 2005.*

* cited by examiner

*Primary Examiner* — Duc Doan
(74) *Attorney, Agent, or Firm* — Fujitsu Patent Center

(57) ABSTRACT

A computer-readable, non-transitory medium storing a program for measuring a performance in a system including a storage unit and a plurality of control units for controlling an access to the storage unit, the program causing a computer to execute a procedure, the procedure includes estimating a specification area in address information including an address area in which an address of an access target of the storage unit is set and the specification area in which specification information for specifying a control unit for controlling an access to the access target is set, and verifying a reliability of the system by accessing the storage unit on the basis of a specification information in the specification area.

17 Claims, 18 Drawing Sheets

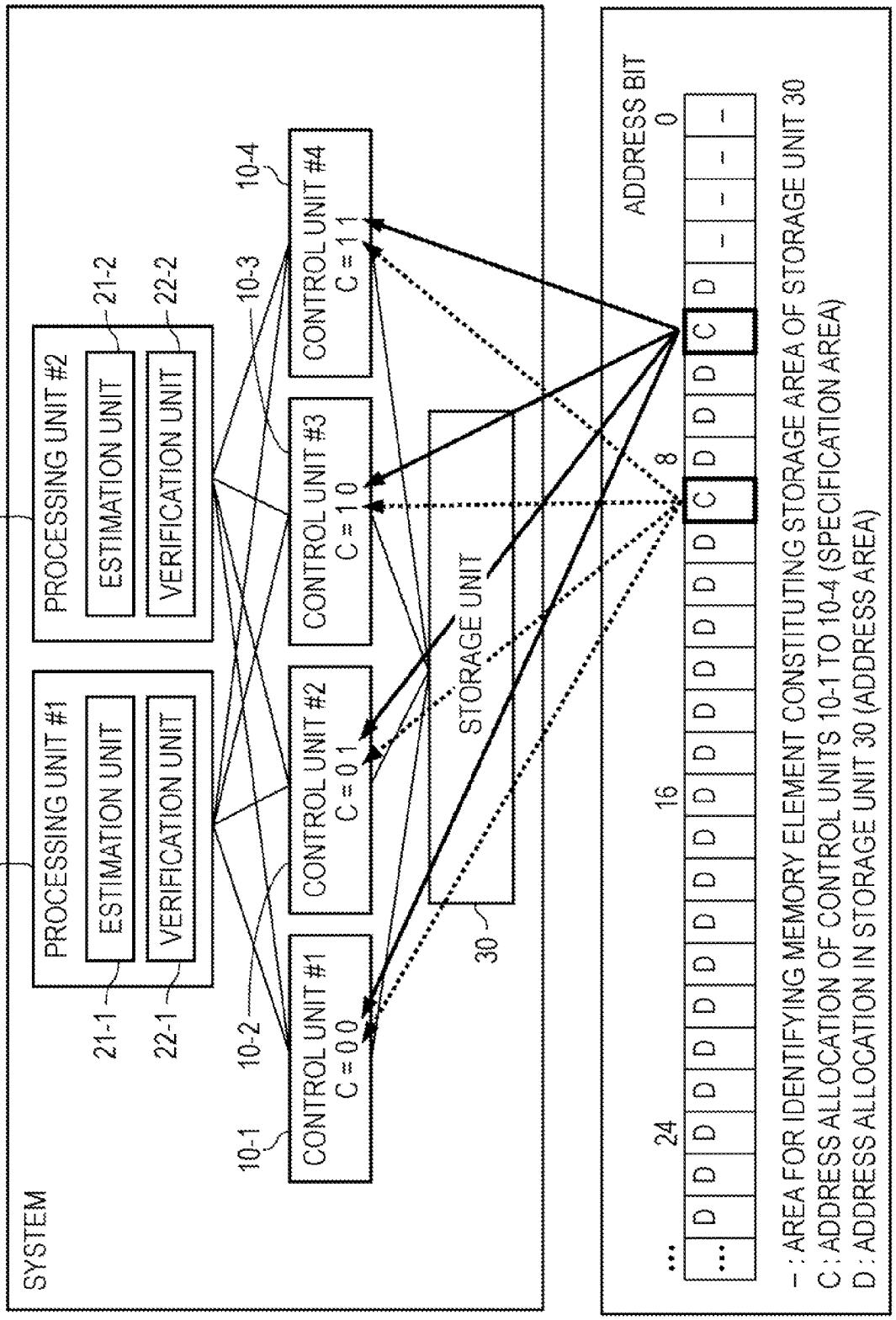

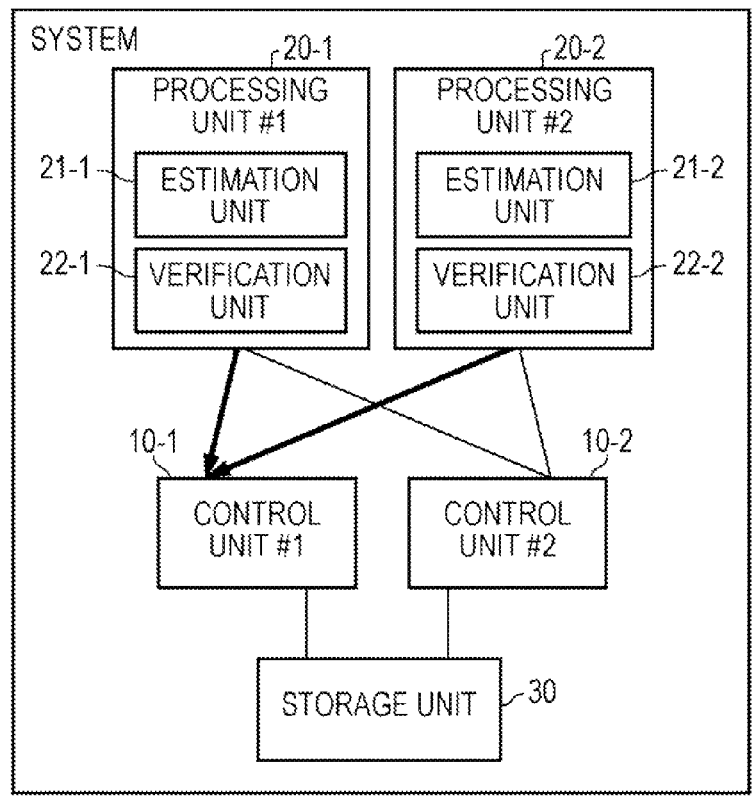

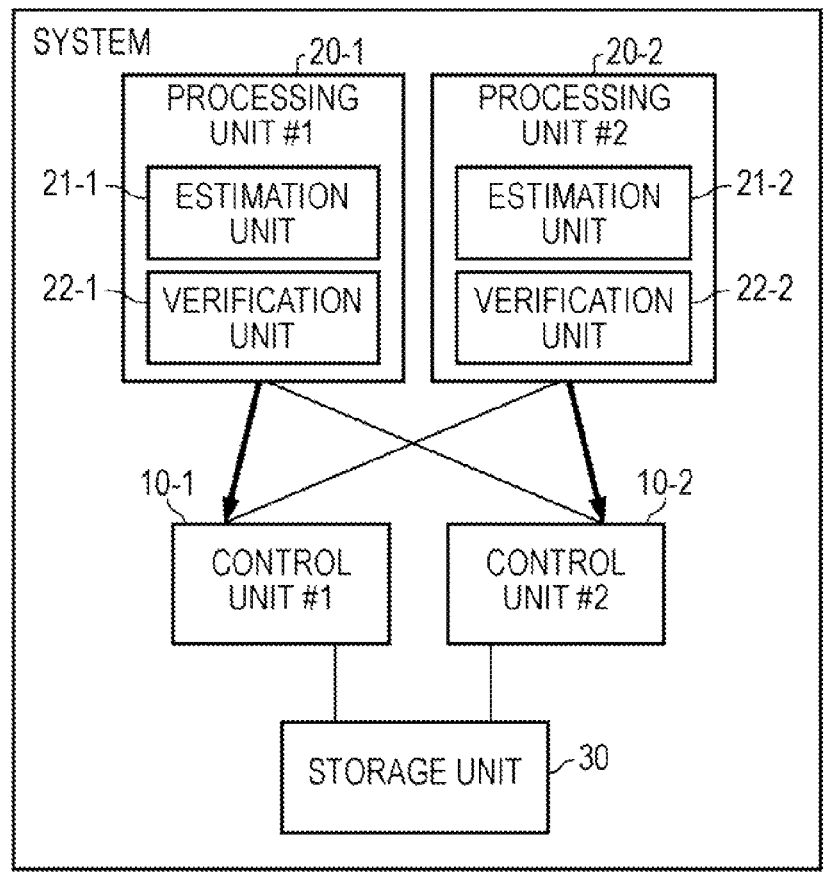

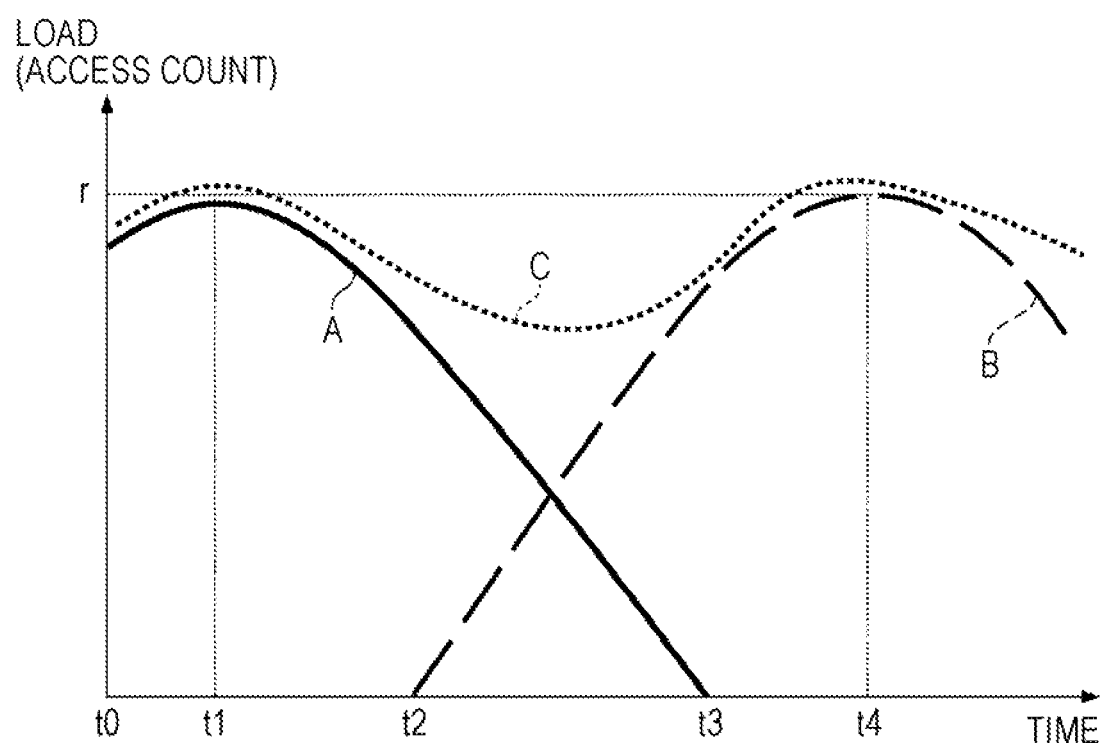

METHOD OF VERIFYING SYSTEM PERFORMANCE AND PERFORMANCE MEASUREMENT APPARATUS

CROSS-REFERENCE TO RELATED APPLICATION

This application is based upon and claims the benefit of priority of the prior Japanese Patent Application No. 2010-183787 filed on Aug. 19, 2010, the entire contents of which are incorporated herein by reference.

FIELD

The embodiments discussed herein related to a method of verifying a system performance and a performance measurement apparatus.

BACKGROUND

FIG. 18 is a block diagram of a configuration example of an information processing system. A system 100 illustrated in FIG. 18 is provided with a control unit 110, a CPU (Central Processing Unit) 120, a memory 130, and an I/O (Input/Output) channel 140.

The control unit 110 is adapted to arbitrate memory accesses from the CPU 120 or the I/O channel 140 to the memory 130, and, for example, a system controller is exemplified.

In case where a load verification is carried out with respect to the system 100 illustrated in FIG. 18, in a load generation apparatus or software, a method of frequently generating the memory accesses from the CPU 120 or the I/O channel 140 to the memory 130 is employed.

It may be noted that a method is proposed in which the load generation apparatus creates a pattern for DMA (Direct Memory Access) for changing a load target address to a memory space at an arbitrary address interval and executes the DMA to apply loads of various access patterns to an examination target system.

Also, in a server computer network, a configuration is also proposed in which a performance test system is provided with a test logic segment and a switched network, and load generated from a test target apparatus is concentrated on a particular test target apparatus.

Japanese Laid-open Patent Publication No. 2008-059338 and Japanese Laid-open Patent Publication No. 2008-191837 are examples of related art.

In recent years, a system provided with a plurality of CPUs and a plurality of control units is developed.

In the above-mentioned system, a method is proposed of carrying out a load dispersion between the control units so that the accesses based on access requests to the memory by the plurality of CPUs are not concentrated on one control unit.

For the load dispersion, for example, a configuration is proposed in which with respect to the memory accesses to a continuous area of a high use frequency, in order that the memory accesses are not concentrated on the individual control units, a control unit that arbitrates the memory accesses for each of the memory addresses is allocated.

Also, when the accesses are generated from the plurality of CPUs to the same address of the memory, the above-mentioned system control unit is adapted to alleviate the loads applied on the control unit and the memory by directing the subsequent access destination of the CPU to a cache memory of the CPU that has accessed the relevant memory address beforehand.

At this time, in a case where the control unit does not direct the subsequent access destination of the CPU to a cache memory of another CPU, the control unit carries out an order assurance of the plurality of CPUs in an order of the accesses to the same address of the memory and stops the accesses of the subsequent CPUs.

Also, in a case where the accesses are generated from the plurality of CPUs to the same address of the memory, a situation occurs that the address requests to the same address are held up, and accordingly the memory existing in the lowermost stream of the accesses becomes a bottle neck of the system.

On the other hand, in a case where the load verification with respect to the above-mentioned system is carried out, even when the accesses are generated from the plurality of CPUs to the same address of the memory, the load with respect to the control unit is decreased because of the reference to the cache memory by the respective CPUs, the order assurance by the control unit, the hold-up of the access requests in the memory, and the like.

Therefore, in a case where the load verification with respect to the above-mentioned system is carried out, with the load generation apparatus or software, it is difficult to frequently randomly generate the memory accesses from the plurality of CPUs to the memory and concentrate the accesses on the individual control units.

That is, as described above, by the load dispersion by the system, as one of the control units among the plurality of control units is allocated to each of the memory addresses, the access destination (memory address) of the memory access is random. Thus, it is desirable to concentrate the loads on a particular control unit. Also, because the access destination (memory address) of the memory access is random, a memory access where the access is directed to the cache memory of the CPU may also be generated.

Then, in the above-mentioned case, the load with respect to the control unit is decreased, and the load verification with respect to the system is deteriorated.

Also, according to the above-mentioned method in which the load generation apparatus creates the pattern for the DMA and executes the DMA, the system provided with the plurality of control units that perform the above-mentioned load dispersion is not supposed as the target. Therefore, according to the above-mentioned method, it is desirable to create a state transition in which the loads caused by the memory accesses from the CPU spread over the plurality of control units. Also, according to the above-mentioned method, the situation in which the accesses are generated from the plurality of CPUs to the same address of the memory and the decrease in the load on the control unit is not taken into account.

In the system including the plurality of control units where the load dispersion is carried out, a method of concentrating the load on the particular control unit is not yet proposed.

In the above, the case has been described in which the memory accesses from the plurality of CPUs are arbitrated by the plurality of control units, but a similar problem occurs also in a case where the memory accesses are arbitrated by the plurality of control units when the accesses are made to the storage unit such as the memory via interfaces such as a plurality of I/O channels. In addition to that, a similar problem occurs also in another system having a function of switching the plurality of control units on the basis of the address of the access destination.

SUMMARY

According to an object of the present application, a computer-readable, non-transitory medium storing a program for measuring a performance in a system including a storage unit and a plurality of control units for controlling an access to the storage unit, the program causing a computer to execute a procedure, the procedure includes estimating a specification area in address information including an address area in which an address of an access target of the storage unit is set and the specification area in which specification information for specifying a control unit for controlling an access to the access target is set, and verifying a reliability of the system by accessing the storage unit on the basis of a specification information in the specification area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an allocation example of control units based on address information in a storage unit in another system according to the first embodiment;

FIG. 11A and FIG. 11B illustrate load concentration accesses by the verification units according to the first embodiment;

FIG. 12A and FIG. 12B illustrate the load concentration accesses by the verification units according to the first embodiment;

FIG. 14 illustrates a load situation of the system according to the first embodiment;

DESCRIPTION OF EMBODIMENTS

Hereinafter, embodiments will be described with reference to the drawings.

Figure 1:
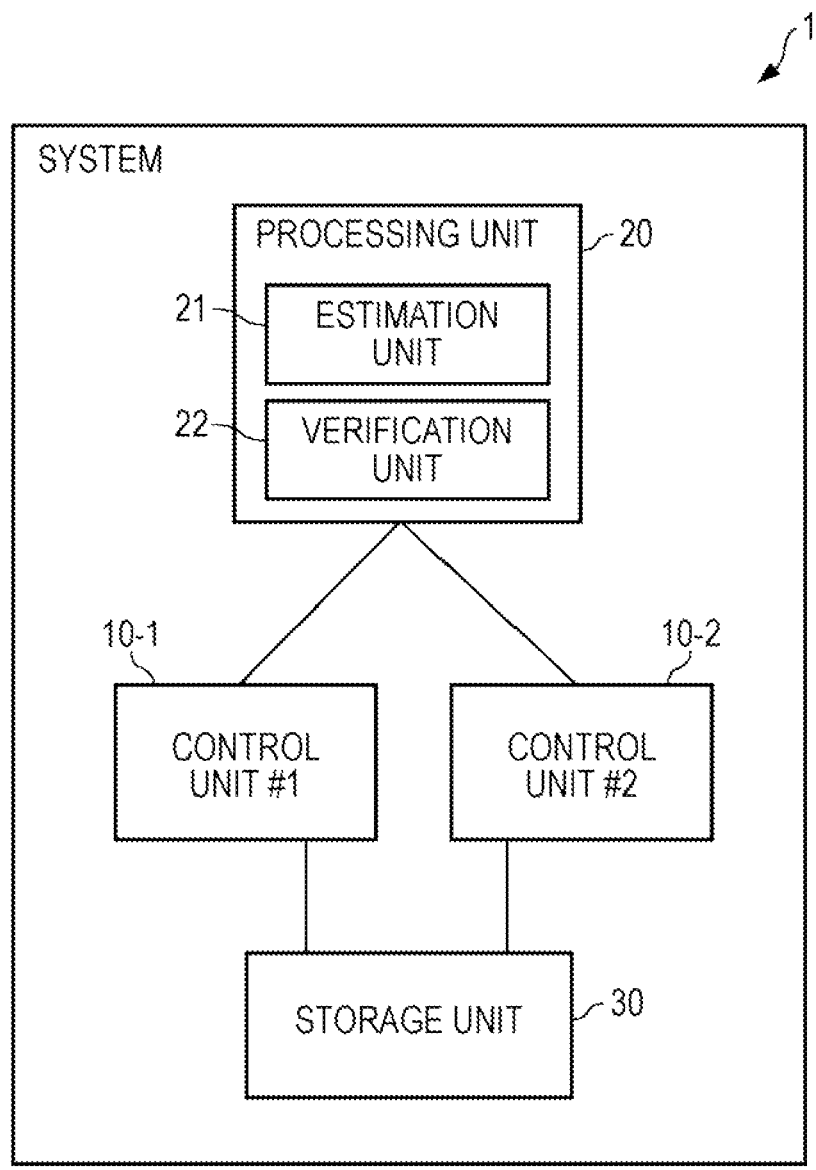
FIG. 1 is a block diagram of a configuration example of a system according to a first embodiment.

FIG. 1 is a block diagram of a configuration example of a system 1 according to a first embodiment.

The system 1 includes plural, in an example illustrated in FIG. 1, two control units 10-1 and 10-2, a processing unit 20, and a storage unit 30.

The control units 10-1 and 10-2 are adapted to arbitrate accesses from the processing unit 20 to the storage unit 30.

The control units 10-1 and 10-2 are verification targets of an apparatus verification program according to the present embodiment.

For the control units 10-1 and 10-2, for example, a system controller is exemplified. Hereinafter, a case will be described in which system controllers are used for the control units 10-1 and 10-2. However, the embodiment is not limited to this, and instead of the system controllers, another apparatus having a function of arbitrating accesses from the processing unit 20 to the storage unit 30 may also be used.

Hereinafter, for a reference symbol denoting the control unit, reference symbols 10-1 and 10-2 are used when it is necessary to identify one of the plurality of control units, but reference symbol 10 is used when an arbitrary control unit is referred to.

The processing unit 20 accesses the storage unit 30 via one of the control units 10-1 and 10-2 serving under the processing unit 20.

For the processing unit 20, for example, a CPU or another processing apparatus or the like that accesses the storage unit 30 via an interface such as an I/O channel is exemplified. Hereinafter, a case will be described in which the CPU is used for the processing unit 20. However, the embodiment is not limited to this, and instead of the CPU, another apparatus having a function of accessing the storage unit 30 via the interface such as the I/O channel may also be used.

The processing unit 20 includes the estimation unit 21 and the verification unit 22 for measuring a performance of the system 1. Herein, functions as the estimation unit 21 and the verification unit 22 are realized as the processing unit 20 executes the apparatus verification program installed in the storage unit 30 or the like.

It may be noted that details of the estimation unit 21 and the verification unit 22 will be described below.

The storage unit 30 is a storage apparatus on the system 1 and is adapted to store data used on the system 1 in a storage area of the storage unit 30.

For the storage unit 30, for example, a memory or the like is exemplified. The storage unit 30 is provided with a plurality of memory elements that constitutes a storage area.

Hereinafter, information representing an address of a storage area in the storage unit 30 is referred to as "address information".

It may be noted that in FIG. 1, only one processing unit 20 is included in the system 1, but a plurality of processing units may also be included in the system.

Figure 2:
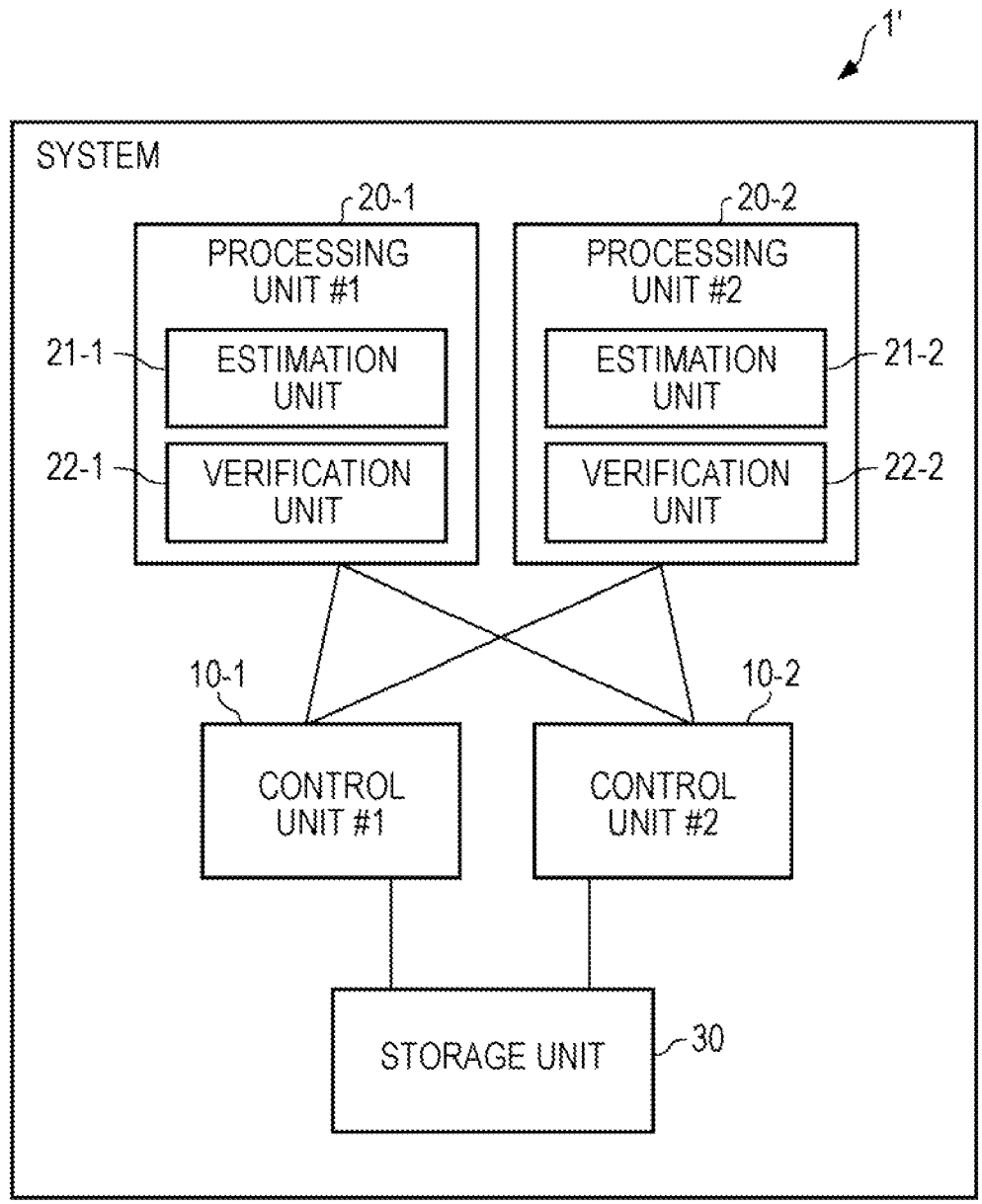
FIG. 2 is a block diagram of a configuration example of another system according to the first embodiment.

FIG. 2 is a block diagram of a configuration example of another system 1' according to the first embodiment.

It may be noted that in FIG. 2, elements assigned with the same reference symbols as the above-mentioned reference symbols indicate the same or almost identical elements, and therefore a part of a description thereof will be omitted.

The system 1' includes plural, in an example illustrated in FIG. 2, two control units 10-1 and 10-2, plural, in an example illustrated in FIG. 2, two processing units 20-1 and 20-2, and the storage unit 30.

The processing units 20-1 and 20-2 respectively access the storage unit 30 via one of the control units 10-1 and 10-2 serving under the processing units.

For the processing units 20-1 and 20-2, for example, CPUs or other processing apparatuses that access the storage unit 30 via the interface such as the I/O channel are exemplified. Hereinafter, a case will be described in which the CPUs are used for the processing units 20-1 and 20-2, but instead of the CPUs, another apparatus having a function of accessing the storage unit 30 via the interface such as the I/O channel may also be used.

Hereinafter, for a reference symbol denoting the processing unit, for a reference symbol denoting the processing unit, reference symbols 20-1 and 20-2 are used when it is necessary to identify one of the plurality of processing units, but reference symbol 20 is used when an arbitrary processing unit is referred to.

As illustrated in FIG. 2, in a case where the plurality of processing units are included in the system, the control unit 10 performs the arbitration so that the memory data of the storage unit 30 may be correctly referred to between the respective processing units.

The processing unit 20-1 includes the estimation unit 21-1 and the verification unit 22-1. Similarly, the processing unit 20-2 includes the estimation unit 21-2 and the verification unit 22-2. Herein, functions of the estimation units 21-1 and 21-2 and functions of the verification units 22-1 and 22-2 are realized while the processing units 20-1 and 20-2 execute the apparatus verification program installed in the storage unit 30 or the like.

Hereinafter, for a reference symbol denoting the estimation unit, reference symbols 21-1 and 21-2 are used when it is necessary to identify one of the plurality of estimation units, but reference symbol 21 is used when an arbitrary estimation unit is referred to. Also, for a reference symbol denoting the verification unit, reference symbols 22-1 and 22-2 are used when it is necessary to identify one of the plurality of verification units, but reference symbol 22 is used when an arbitrary verification unit is referred to.

The system 1 or 1' performs a load verification (load examination) of concentrating the load on a particular control unit 10 by the estimation unit 21 and the verification unit 22.

Detailed operations by the estimation unit 21 and the verification unit 22 will be specifically described in a description at the time of the load examination of the system 1' after a description is made on the system 1' at the time of a normal processing/non-load verification.

It may be noted that the time of the normal processing refers to a state in which an examination such as an apparatus verification is not carried out in the system 1' and a normal processing is carried out. Also, the time of the non-load examination refers to a state in which the examination such as the apparatus verification is carried out in the system 1' but the load examination in which the load is concentrated on the particular control unit 10 is not carried out.

The time of the load examination refers to a state in which the load examination in which the load is concentrated on the particular control unit 10 in the system 1' is carried out.

Hereinafter, with reference to the system 1' illustrated in FIG. 2, an operation of the system 1' according to the present embodiment will be described, but if not otherwise specified, the system 1 illustrated in FIG. 1 performs a similar operation.

Next, with reference to the system 1' illustrated in FIG. 2, an operation of the system 1' at the time of the normal processing/non-load verification will be described.

The system 1' performs a load dispersion between the control units 10-1 and 10-2 so that accesses based on the access requests by the processing units 20 to the storage unit 30 are not concentrated on one control unit 10.

For the load dispersion, for example, interleaving of allocating the control units 10 that arbitrate the access for every address with respect to the access to a continuous area of the storage unit 30 with a high use frequency to avoid the load concentration on the particular control unit is exemplified.

In the example illustrated in FIG. 2, when the access from the processing unit 20 to the storage unit 30 is generated, the system 1' causes one of the control units 10 allocated to an address of an access target to arbitrate the relevant access.

In this manner, with respect to the access from the processing unit 20 to the storage unit 30, on the basis of information set in a predetermined area in the address information of the access target, the system 1' performs the load dispersion so that the load is not concentrated on the particular control unit 10. In other words, on the basis of the load dispersion, it may be mentioned that the system 1' is designed to exercise a desired performance even when the accesses to the continuous addresses of the memory are carried out.

Hereinafter, an area for address information in which information for specifying the control unit that controls the accesses to the access target of the storage unit 30 is set is referred to as specification area. Also, information set in the specification area is referred to as specification information.

For the specification information for determining on which one of the control units 10-1 and 10-2 is used by the system 1' for the access to the storage unit 30, for example, a value of a bit in the specification area among the address information representing the access target of the storage unit 30 is exemplified according to the first embodiment.

Figure 3:
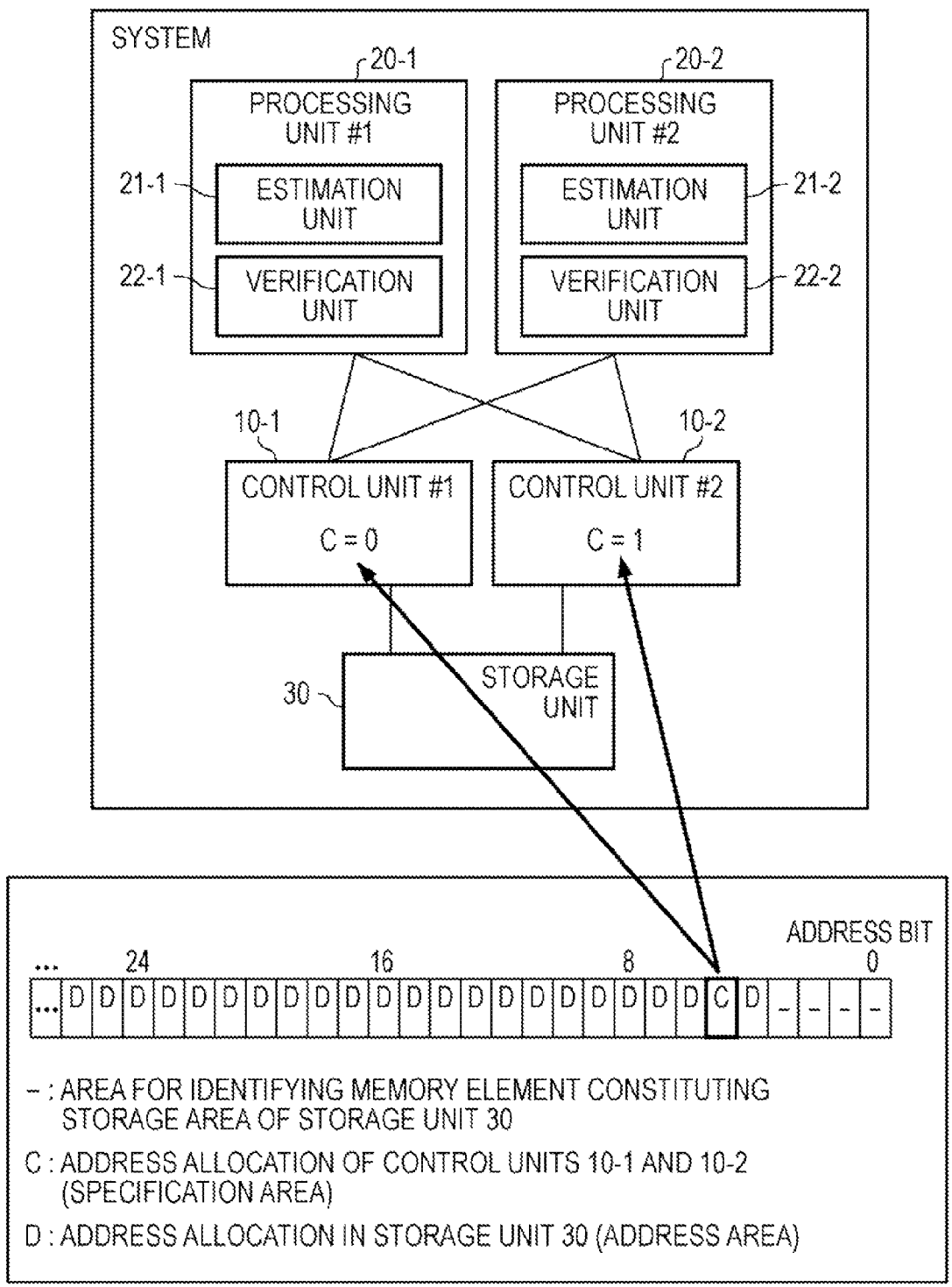
FIG. 3 illustrates an allocation example of control units based on address information in a storage unit according to the first embodiment.

FIG. 3 illustrates an allocation example of the control units 10 based on the address information in the storage unit 30 of the system 1' according to the first embodiment.

In the example illustrated in FIG. 3, bits in a range at and after an address bit 4 where "C" and "D" are assigned among the address information in the storage unit 30, to elaborate, in a range at and after an address bit 0 where "-", "C", or "D" is assigned are bits representing an address of the storage unit 30.

Hereinafter, an area where the address of the storage unit 30 in the address information is allocated, that is, an area where the address of the access target of the storage unit 30 is set is referred to as address area. In the example illustrated in FIG. 3, bits of the area in the range at and after the address bit 4 where "C" and "D" are assigned correspond to as address area.

Also, an address bit 5 assigned with "C" among the address information in the storage unit 30 is the specification area, to elaborate, a bit for allocating the control units 10 used for the access.

Herein, the address bit 5 is a part of bits representing the address of the storage unit 30 and is also at the same time, a bit for allocating the control units 10. In this manner, the bit for performing the allocation of the control unit 10 may exist in the range where the address allocation of the storage unit 30 is carried out. Also, the range (bit) where the allocation of the control units 10 is carried out may exist in a range different from the range where the address allocation of the storage unit 30 is carried out. That is, the above-mentioned specification area may be a part of the area of the address area or may be an area different from the address area.

Among the address information in the storage unit 30, the address bits 0 to 3, to elaborate, bits in a range assigned with "-" in FIG. 3 are an area for identifying memory elements constituting the storage area of the storage unit 30.

From the above description, the address information includes the address area in the range at and after the address bit 4 assigned with "C" or "D" in FIG. 3 and the area assigned with "-" for identifying the memory elements constituting the storage area of the storage unit 30 in the range of the address bits 0 to 3 in FIG. 3.

When the access from the processing unit 20 to the storage unit 30 is generated, the system 1' refers to a value set in the address bit 5 of the address information representing the address of the storage unit that becomes the access target. Then, while following a previously set sorting rule of the control units 10, on the basis of the referred value, the system 1' specifies to which one of the control units 10-1 and 10-2 the relevant access is allocated.

For example, in a case where the value of the address bit 5 is "0", the system 1' allocates the access from the processing unit 20 to the storage unit 30 to the control unit 10-1. On the other hand, in a case where the value of the address bit 5 is "1", the system 1' allocates the access from the processing unit 20 to the storage unit 30 to the control unit 10-2.

Figure 4:
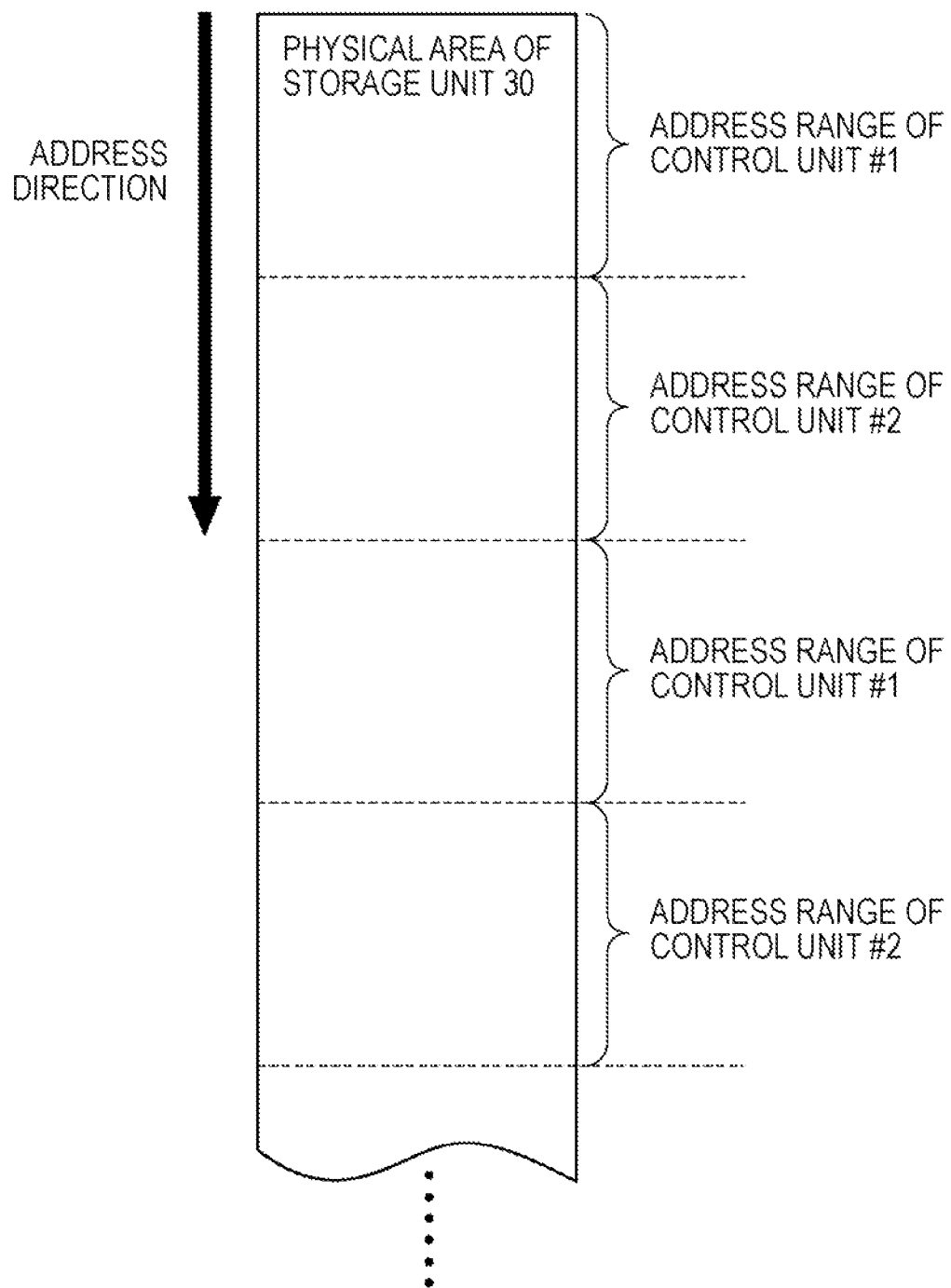
FIG. 4 illustrates a relation between a physical area of the storage unit and the allocation of the control unit according to the first embodiment.

FIG. 4 illustrates a relation between the physical area of the storage unit 30 and the allocation of the control unit 10 according to the first embodiment.

As illustrated in FIG. 4, one of the control units 10 is allocated for every address range of the storage unit 30.

A width of this address range is decided by a location of the bit where the control unit 10 is allocated illustrated in FIG. 3 described above. In the example illustrated in FIG. 3, the address bit 5 assigned with "C" the bit where the control unit 10 is allocated.

As described above, in the example illustrated in FIG. 3, when the value of the address bit 5 is "0", the system 1' allocates the access from the processing unit 20 to the storage unit 30 to the control unit 10-1. On the other hand, when the value of the address bit 5 is "1", the system 1' allocates the access from the processing unit 20 to the storage unit 30 to the control unit 10-2.

Therefore, as illustrated in FIG. 4, in the address where the physical areas of the storage unit 30 are continuous, when the value of the address bit 5 is transited from "0" to "1", the control unit 10 that arbitrates the access to the relevant address is switched from the control unit 10-1 to the control unit 10-2. On the other hand, when the value of the address bit 5 is transited from "1" to "0", the control unit 10 that arbitrates the access to the relevant address is switched from the control unit 10-2 to the control unit 10-1.

Therefore, in the example illustrated in FIG. 3, when attention is paid to the range of the address bits 5 to 0, in a case where the value of the address bits 5 to 0 is in a range from "000000" to "011111", the access to the relevant address is arbitrated by the control unit 10-1. On the other hand, in a case where the value of the address bits 5 to 0 is in a range from "100000" to "111111", the access to the relevant address is arbitrated by the control unit 10-2.

In this manner, the system 1' performs the load dispersion with respect to the accesses from the processing unit 20 to the continuous addresses of the storage unit 30 on the basis of the address information of the access target so that the load is not concentrated on the particular control unit 10.

It may be noted that the above-mentioned specification area may also be the plurality of address bit addresses. By using FIG. 5, a case will be described in which the specification area is address bits at two locations.

FIG. 5 illustrates an allocation example of control units based on the address information in the storage unit 30 of another system 1" according to the first embodiment.

The system 1" illustrated in FIG. 5 is provided with four control units 10-1 to 10-4 and is different from the system 1' illustrated in FIG. 3 in that the control units 10-1 to 10-4 are distinguished by 2-bit specification areas.

The system 1' illustrated in FIG. 3 may allocate the value "0" or "1" of the 1-bit specification area to the two control units 10-1 and 10-2, but the system 1" is provided with the four control units 10-1 to 10-4 and therefore may not allocate the value "0" or "1" of the 1-bit specification area to the control units 10-1 to 10-4.

On the other hand, when the specification area is set as 2 bits and the bits of the specification area are combined as a 2-bit value, the system 1" may allocate "00", "01", "10", and "11" equivalent to the same number as the number of the control units 10-1 to 10-4 to the four control units 10-1 to 10-4.

Therefore, the system 1" switches the control units 10-1 to 10-4 for arbitrating the access from the processing unit 20 to the storage unit 30 on the basis of the 2-bit value of the specification area.

It may be noted that in FIG. 5, elements assigned with the same reference symbols as the above-mentioned reference symbols indicate the same or almost identical elements, and therefore a part of a description thereof will be omitted.

Hereinafter, by using FIG. 5, the allocation example of the control units 10-1 to 10-4 based on the address information in the storage unit 30 will be described.

Like the system 1', at the time of the normal processing/non-load verification, the system 1" performs the load dispersion between the control units 10-1 to 10-4 so that the accesses are concentrated on one control unit 10 caused by the access requests by the processing units 20 to the storage unit 30.

In the example illustrated in FIG. 5, the address bits 5 and 9, to elaborate, bits 5 assigned with "C" in FIG. 5 among the address information in the storage unit 30 are the specification areas, to elaborate, bits for allocating the control units 10.

Herein, as described above, the address bits 5 and 9 are bits for performing the address allocation in the storage unit 30 and are also at the same time bits for performing the allocation of the control units 10. In this manner, like the case of the system 1', the bits for performing the allocation of the control units 10 may exist in the range where the address allocation in the storage unit 30 is carried out. Also, the range where the allocation of the control units 10 is carried out may exist in a range different from the range where the address allocation in the storage unit 30 is carried out.

It may be noted that in a case where the specification area is a plurality of bits, each bit in the specification area may be separated from each other like the address bits 5 and 9 as illustrated in FIG. 5 or may also be adjacent to each other like the address bits 5 and 6, for example.

When the access from the processing unit 20 to the storage unit 30 is generated, the system 1" refers to the specification area, to elaborate, the values set in the address bits 5 and 9 in the allocation example illustrated in FIG. 5. Then, while following the previously set sorting rule of the control units 10, on the basis of the referred value, the system 1" specifies to which one of the control units 10-1 to 10-4 the relevant access is allocated for the arbitration.

At this time, the system 1" combines the two address bits set in the specification area of the address information as 2-bit data and creates information of "00", "01", "10", or "11" to select one control unit 10 from among the control units 10-1 to 10-4.

For example, in a case where the value of the address bit 9 is "0" and also the value of the address bit 5 is "0", to elaborate, as illustrated in FIG. 5, in a case where C="00" is established by combining the address bits 9 and 5, the system 1" allocates the access from the processing unit 20 to the storage unit 30 to the control unit 10-1 for the arbitration. Also, in a case where the value of the address bit 9 is "0" and also the value of the address bit 5 is "1", to elaborate, as illustrated in FIG. 5, a case where C="01" is established, the system 1" allocates the access from the processing unit 20 to the storage unit 30 to the control unit 10-2 for the arbitration. Furthermore, in a case where the value of the address bit 9 is "1" and also the value of the address bit 5 is "0", to elaborate, as illustrated in FIG. 5, in a case where C="10" is established, the system 1" allocates the access from the processing unit 20 to the storage unit 30 to the control unit 10-3 for the arbitration. Then, in a case where the value of the address bit 9 is "1" and also the value of the address bit 5 is "1", to elaborate, as illustrated in FIG. 5, in a case where C="11" is established, the system 1" allocates the access from the processing unit 20 to the storage unit 30 to the control unit 10-4 for the arbitration.

In this manner, also in the system 1" including the four control units 10, like the system 1' described by using FIG. 3, on the basis of the values of the address bits set in the specification area of the address information, the control unit 10 that arbitrates the access from the processing unit 20 to the storage unit 30 is switched.

As described above, in the system 1" including the four control units 10, the two address bits at arbitrary locations are set in the address information as the specification area.

Similarly, in a system including 2m pieces (m is an integer larger than or equal to 1) of control units 10, m pieces of address bits at arbitrary locations are set in the address information as the specification area, and on the basis of the m pieces of values of the address bits, the control unit 10 that arbitrates the access from the processing unit 20 to the storage unit 30 is switched in the system.

Next, with reference to the system 1' illustrated in FIG. 2, an operation at the time of the load examination in the system 1' will be described.

As described above, the time of the load examination refers to a state in which the load examination is carried out where the load is concentrated on a particular control unit 10 the system 1'.

In a case where the load verification with respect to the system 1' described above is carried out, the processing unit 20 randomly frequently generates memory accesses to the storage unit 30 so that the load is concentrated on the particular control unit 10. However, through the load dispersion by the system 1', one of the control units 10-1 and 10-2 is allocated to every address of the access target. As the access destinations of the memory accesses are random, the access destinations are dispersed, and it is difficult to concentrate the load on the particular control unit 10.

Therefore, when the load is concentrated on the particular control unit 10, it is desirable to grasp the configuration of the control unit 10 on the system 1' in advance and continuously perform the accesses to the storage unit 30 via the particular control unit 10 on the basis of the grasped configuration.

However, on hardware, the control units 10-1 and 10-2 are adapted to perform a processing such as an arbitration on the accesses issued from the processing units 20 to the storage unit 30, and software (program) that performs the accesses to the storage unit 30 by the processing unit 20 may not recognize the control units 10.

To elaborate, the existence of the control units 10-1 and 10-2 may not be observed from the software (program) executed by the processing unit 20.

Therefore, it is difficult for the software executed by the processing unit 20 to obtain information as to in which area the information is set among the areas of the address information in the storage unit 30 on the basis of which the load dispersion is performed by the system 1' and information such as the number of the control units 10 provided to the system 1. That is, it is difficult to grasp the configuration of the control unit 10 on the system 1' with the software such as the apparatus verification program executed by the processing unit 20.

In view of the above, according to the present embodiment, in a case where the load verification for concentrating the load on the particular control unit 10 is carried out, in order for the estimation unit 21 to grasp the configuration of the control unit 10 on the system 1', a location of the specification area is estimated where the specific information among the address information in the storage unit 30 is set.

Then, the verification unit 22 performs the load verification by concentrating the load on the particular control unit 10 on the basis of the estimation result by the estimation unit 21.

It may be noted that the concentration of the load refers to a concentration of accesses with respect to a target apparatus in a short period of time.

By paying attention on an address line that connects the processing unit 20 to the control unit 10, from the address information in the storage unit 30, the estimation unit 21 estimates an area in the address information where the information is set that is used for determining which control unit among the control units 10-1 and 10-2 is used for the access to the storage unit 30. For the specification area, for example, the address bit 5 described above in the example illustrated in FIG. 3, to elaborate, the area assigned with "C" in FIG. 3 is exemplified. For the area representing the address of the storage unit 30 among the address information in the storage unit 30, that is, the address area that is an area where the address of the access target of the storage unit 30 is set, for example, the areas assigned with "C" and "D" at and after the address bit 4 described above in the example illustrated in FIG. 3 are exemplified.

To elaborate, the estimation unit 21 has a function of estimating the specification area in the address information.

It may be noted that "estimation" by the estimation unit 21 refers to an operation of finding out the location of the specification area of the load dispersion by changing access operations to the storage unit 30 in various manners.

A detailed operation of the estimation unit 21 will be described below.

The verification unit 22 has a function of sorting the plural pieces of address information generated for concentrating the load on the particular control unit 10 while following the specification information set in the specification area that is estimated by the estimation unit 21. Also, the verification unit 22 has a function of performing the accesses with respect to the storage unit 30 by using the plural pieces of sorted address information and concentrating the load on the particular control unit 10 of the system 1' at the time of the storage unit access. To be more specific, the verification unit 22 randomly generates the plural pieces of address information of the storage unit 30, refers to the specification information set in the specification area that is estimated by the estimation unit 21, and sorts the plural pieces of generated address information while following the referred specification information. Then, the verification unit 22 performs the accesses with respect to the storage unit 30 by using the plural pieces of sorted address information and performs the accesses with respect to the storage unit 30 by identifying the control unit 10 to which the address information is allocated to perform the load verification by concentrating the load on the particular control unit 10.

In the thus configured system 1, the specification area in the address information is estimated by the estimation unit 21. Then, in the verification unit 22, on the basis of the specification information set in the specification area that is estimated by the estimation unit 21, the control unit 10 to which the relevant address information is allocated is identified, and the reliability of the system 1 is verified while the load is provided to the particular control unit 10 in a concentrated manner.

Hereinafter, a function of the estimation unit 21 of the system 1' illustrated in FIG. 2 in a case where the load verification is carried out by concentrating the load on the particular control unit 10 will be described. The function as the estimation unit 21 is realized as the processing unit 20 executes the apparatus verification program installed in the storage unit 30 or the like. To elaborate, the operation by the estimation unit 21 is carried out at an executing timing for the load verification (the load examination).

The estimation unit 21 estimates the location of the specification area in the address information while it is assumed that the address is allocated to the control unit 10 of the system 1'.

For example, the estimation unit 21 generates plural pieces of address information while fixing information on an area of the address information in which the specification area may exist and also performs the accesses to the plural pieces of generated address information to measure a performance at a time when the access is made to the storage unit of the system 1'. The estimation unit 21 generates address information by sequentially changing the area where the information is fixed and performs the accesses to the storage unit by using the generated address information to measure the performance at that time.

Then, the estimation unit 21 estimates the location of the specification area in the address information on the basis of the performance measurement results in the respective states and the areas of the address information where the information is fixed in the respective states.

By performing the following processings (i) to (iii), for example, the estimation unit 21 estimates the location of the bit that is the specification area. (i) The performance at a time when a continuous access is carried out with respect to the system 1' is measured as a reference of the performance.

Herein, the continuous access refers to an access in a mode of accessing to the storage unit in a minimum unit access size. (ii) The performance at a time when a discontinuous access is carried out with respect to the system 1' while the access width is increased from the access width at the time of the continuous access.

Herein, the discontinuous access refers to an access in a mode of accessing to the storage unit in an access size interval increased from the minimum unit access size interval at the time of the continuous access.

When the discontinuous access in which the access width is increased from the access width at the time of the continuous access is carried out, the estimation unit 21 carries out the discontinuous access by using the address in which the number of the address bits where the value is fixed in an area in the address information in the storage unit 30 is increased. (iii) The location of the specification area in the address information is estimated on the basis of the value of which bit is fixed when the decrease in the performance in a predetermined range is observed from a performance as a reference.

First, the processing (i) will be described.

As described above, at the time of the normal processing/ non-load verification, the system 1' is designed to exhibit the performance even when the access to the addresses where the areas are continuous occurs because of the load dispersion. In view of the above, as the reference of the performance, the estimation unit 21 measures the performance when the continuous access with respect to the storage unit 30 in the system 1' is carried out.

Herein, the minimum unit of the access size with respect to the storage unit is set as a register size on an apparatus architecture, and as described above, the continuous access refers to the access in the mode of accessing to the storage unit in the minimum unit access size.

Hereinafter, the address of the storage unit 30 has the 64-bit length, and the register size on the apparatus architecture of the system 1' is set as 8 bytes.

In the continuous access in this case, the estimation unit accesses the storage unit while the minimum unit of the access size is set as the register size, to elaborate, in an 8-byte interval.

At this time, the estimation unit 21 generates a plurality of continuous addresses having the 8-byte access width as addresses of the continuous access and executes the continuous access on the basis of the generated addresses.

FIG. 6A, FIG. 6B, FIG. 6C, FIG. 6D, and FIG. 6E are explanatory diagrams for describing the address generation by the estimation unit 21 according to the first embodiment at the time of the continuous access and at the time of the discontinuous access.

Figure 6A:
FIGS. 6A-6E are explanatory diagrams for explaining an addition method of addressed by the estimation unit according to the first embodiment.

FIG. 6A illustrates a range at and after an address bit 16 of the address information described by using FIG. 3.

Figure 6B:
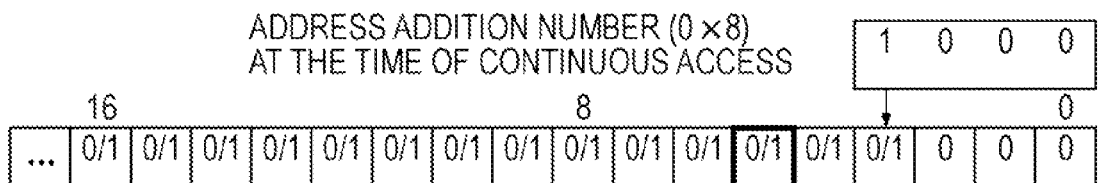

FIG. 6B illustrates an addition pattern of addresses to be added to the address information and the bit 16 and the previous bits of the address information to which the addition pattern is added when the estimation unit 21 generates the addresses at the time of the continuous access in the processing (i).

Figure 6C:
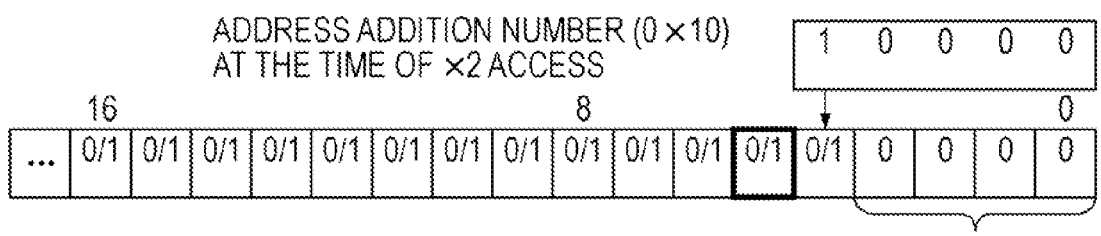
Figure 6D:
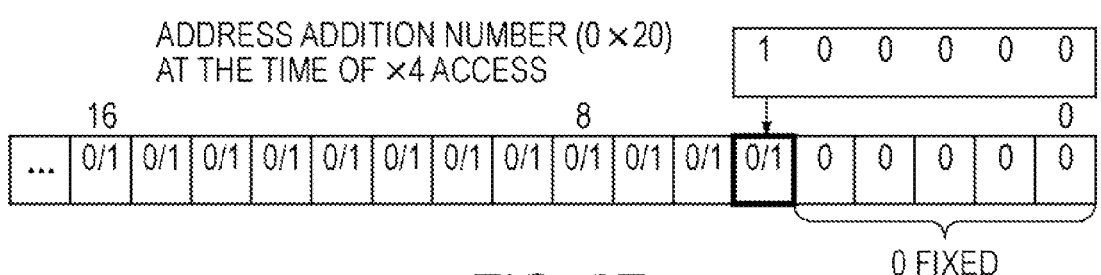
Figure 6E:
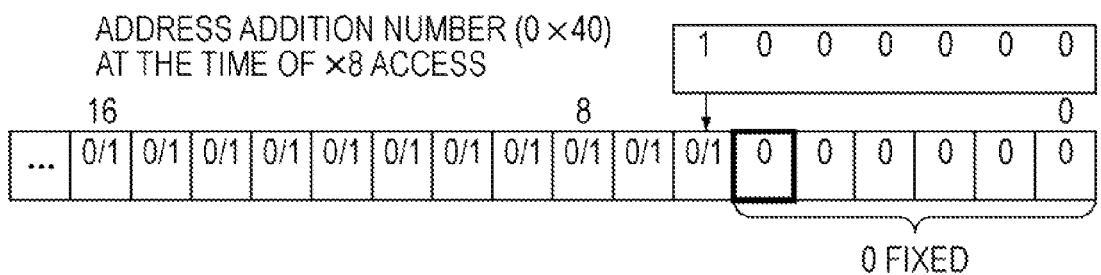

FIG. 6C, FIG. 6D, and FIG. 6E illustrate addition patterns of addresses to be added to the address information and the bit 16 and the previous bits of the address information to which the addition pattern is added when the estimation unit 21 generates the addresses at the time of the discontinuous access in the processing (ii).

It may be noted that in the example illustrated above in FIG. 4, it is presumed that one of the control units 10 is allocated for each range of the address of the storage unit 30 and the specification area exists in the address bit 5.

The estimation unit 21 generates an arbitrary address that becomes the reference when the continuous access is carried out, sequentially adds an address addition pattern at the time of the continuous access with respect to the generated arbitrary address information as the reference, and fixes the values of the lower bits in the relevant address information as "0".

For example, when the continuous access is carried out, with respect to the generated address information of the arbitrary address as the reference, the estimation unit 21 sequentially adds the address addition pattern in which "1" is set in an initial bit and "0" is continuously set in lower bits by the number of bits fixed to "0" among the lower bits of the address information.

In this case, when the address addition pattern is sequentially added, so that the lower bits of the address information are fixed to "0", the estimation unit 21 uses the address information in which the address addition pattern is added and the bits to be fixed to "0" are "0" as the arbitrary address information as the reference.

In the example illustrated in FIG. 6B, with respect to the arbitrary address information as the reference, the estimation unit 21 sequentially adds a predetermined bit value "1000(2) (0×8)" as the address addition pattern at the time of the continuous access and fixes the values of the address bits 2 to 0 of the lower 3 bits as a partial area in the address information to "0".

In this case, as "0" is continuous in 3 bits in the address addition pattern, the estimation unit 21 uses the address information in which the lower 3 bits are "0" as the arbitrary address information as the reference.

It may be noted that the partial area refers to an area of the bits where the value is fixed to "0" among the address information as the address addition pattern is added.

Then, with respect to the arbitrary 8-byte address information as the reference, the estimation unit 21 sequentially adds the address addition pattern at the time of the continuous access, generates a plurality of addresses for performing the continuous access, and executes the continuous access with respect to the storage unit by using the generated addresses.

In this manner, the estimation unit 21 continuously executes the access in which the access width is 8 bytes by using the generated addresses and measures the performance at the access as the reference.

Herein, the arbitrary address information as the reference is address information to which the address addition pattern is added by the estimation unit 21. The address information as the reference may be, for example, address information where all the address bits are "0". It may be noted that as the address addition pattern is added to the address information as the reference by the estimation unit 21, the value of the partial area in the relevant address information is fixed to "0". Therefore, when the address addition pattern is added, the arbitrary address information as the reference needs to be address information in which the value of the partial area is fixed to "0". For example, the address information in which the value of the address bit equivalent to the bit where the value of the address addition pattern is "0" is "0" and the value of the other address bit is arbitrary may be set as the address information as the reference.

The estimation unit 21 adds the address addition pattern by a predetermined time with respect to the arbitrary address information as the reference to generate a predetermined number of addresses. Therefore, the arbitrary address information as the reference is desirably address information in which the addresses of the storage unit 30 do not overflow even when the address addition pattern is added by the predetermined number of times.

It may be noted that the performance is set, for example, as an execution time used when a predetermined data amount is written and/or read between the processing unit 20 and the storage unit 30 but may be other information as long as the information represents a degree of load generated in the control units 10-1 and 10-2.

Herein, when the accesses are generated from the plurality of processing units 20 to the same address of the storage unit 30, by directing the access destinations of the subsequent processing units 20 to the cache memory of the other processing unit 20 that has accessed to the relevant address beforehand, the loads caused on the control unit 10 and the storage unit 30 are reduced.

Also, in a case where the control unit 10 does not direct the access destinations of the subsequent processing units 20 to the cache memory of the other processing unit 20, the control unit 10 performs the order assurance of the plurality of processing units 20 in the order of the accesses to the same address of the storage unit 30 and stops the accesses of the subsequent processing units 20.

Furthermore, when the accesses are generated from the plurality of processing units 20 to the same address of the storage unit 30, as the access requests to the relevant same address are held up, the storage unit 30 existing in the lowermost stream of the relevant access becomes a bottle neck of the system 1'.

In this manner, in the above-mentioned system 1', when the accesses are generated from the plurality of processing units 20 to the same address of the storage unit 30, on the basis of the reference to the cache memory of the respective processing units 20, the order assurance by the control unit 10, the hold-up of the access requests in the storage unit 30, and the like, the load with respect to the control unit 10 is decreased.

Therefore, in a case where the load verification is carried out while the load is concentrated on the particular control unit 10, to increase the load with respect to the particular control unit 10, the estimation units 21-1 and 21-2 desirably mutually generate addresses different from the other estimation unit 21.

In this manner, as the estimation units 21-1 and 21-2 generate the addresses different from the other the estimation unit 21, it is possible to prevent the generation of the accesses to the same address of the storage unit 30 from the respective processing units 20. According to this, the estimation units 21-1 and 21-2 mutually disperse the addresses where the accesses are carried out, and it is possible to prevent the interference of the cache between the processing units 20.

Also, the estimation units 21-1 and 21-2 mutually disperse the addresses where the accesses are carried out to decrease the load on the storage unit 30 in the downstream, and it is possible to increase the load on the control unit 10 in the upstream.

As described above, the estimation units 21-1 and 21-2 suppress the possibility that the load with respect to the control unit 10 is decreased because of the reference to the cache memory of the respective processing units 20, the order assurance by the control unit 10, the hold-up of the access requests in the storage unit 30, and the like and may contribute the improvement of the reliability for the load verification with respect to the system 1'.

It may be noted that not only the above-mentioned processing (i), but also in the processing (ii) which will be described below, similarly, the estimation units 21-1 and 21-2 mutually generate the plurality of addresses for setting the area of the storage unit different from the other estimation unit 21 as the target.

Therefore, for the program for performing the performance measurement and the like, the area of the storage unit 30 related to the processing of the relevant estimation unit 21 may be allocated with respect to the respective processing units 20 each time the processing of the estimation unit 21 is carried out. However, the configuration is not limited to this, and for the program for performing the performance measurement and the like, the area of the storage unit 30 related to the verification may also be allocated with respect to the respective processing units 20 collectively when the measurement on the performance of the system 1' is started.

Next, the processing (ii) will be described.

Once the performance of the system 1' based on the continuous access in the above-mentioned processing (i) is measured, the estimation unit 21 carries out the discontinuous access next in which the access width is increased as compared with the access width at the time of the continuous access with respect to the system 1' and measures the performance of the system 1' at the time of the discontinuous access.

With respect to the arbitrary address information as the reference, the estimation unit 21 sequentially adds the address addition pattern at the time of the discontinuous access which is different from the address addition pattern at the time of the continuous access and fixes the values of the lower bits as a partial area in the address information to "0".

Herein, as described above, the discontinuous access refers to the access in the mode of accessing to the storage unit in the access size interval increased from the minimum unit access size interval at the time of the continuous access. To be specific, the discontinuous access refers to the continuous access to the storage unit for every address where the access width at the time of performing the continuous access is multiplied by 2n.

At this time, the estimation unit 21 generates a plurality of addresses having the address width that is x2n of the access width at the time of the continuous access as the addresses for performing the discontinuous access and executes the discontinuous access.

Therefore, it may be mentioned that the plurality of addresses generated by the estimation unit 21 when the discontinuous access is executed has the x2n access width as compared with the plurality of addresses generated when the continuous access is executed.

Herein, n is an integer larger than or equal to 1 and is equivalent to the bit count that is increased when the discontinuous access is executed with respect to the continuous access when the address addition pattern is executed.

FIG. 6C, FIG. 6D, and FIG. 6E illustrate addition patterns of the addresses to be added to the addition information when the estimation unit 21 carries out the discontinuous access in the processing (ii).

When the discontinuous access is carried out, the estimation unit 21 sequentially adds the address addition pattern at the time of the discontinuous access in accordance with the access width with respect to the arbitrary address information as the reference and fixes the values of the lower bits in the relevant address information as "0".

In the example at the time of the x2 width access illustrated in FIG. 6C, with respect to the arbitrary address information as the reference, the estimation unit 21 sequentially adds a predetermined bit value "10000(2)(0x10)" as the address addition pattern at the time of the discontinuous access and fixes the values of the address bits 3 to 0 that are the lower 4 bits as the partial area in the relevant address information to "0".

It may be noted when the x2 width discontinuous access is carried out, as that the estimation unit 21 increases 1 bit with respect to the address addition pattern at a time when the continuous access is carried out, in the example of FIG. 6C, n becomes 1. Therefore, the plurality of addresses generated by the estimation unit 21 have 2 (=21) access width as compared with the plurality of addresses generated when the continuous access is executed.

Then, to perform the discontinuous access, the estimation unit 21 generates a plurality of addresses obtained by sequentially adding the address addition pattern at the time of the discontinuous access to the arbitrary 8-byte address information as the reference and executes the discontinuous access by using the plurality of relevant generated addresses.

In this manner, the estimation unit 21 continuously executes the access in which the access width is 16 bytes and measures the performance at the x2 width access.

FIG. 6D illustrates an example in which in the x4 width access, with respect to the arbitrary address information as the reference, the estimation unit 21 sequentially adds a predetermined bit value "100000(2)(0x20)" as the address addition pattern at the time of the discontinuous access and fixes the values of the address bits 4 to 0 that are the lower 5 bits as the partial area in the relevant address information to "0".

FIG. 6E illustrates an example in which in the x8 width access, with respect to the arbitrary address information as the reference, the estimation unit 21 sequentially adds a predetermined bit value "1000000(2)(0x40)" as the address addition pattern at the time of the discontinuous access and fixes the values of the address bits 5 to 0 that are the lower 6 bits as the partial area in the relevant address information to "0".

Herein, as already described by using FIG. 5, the system 1" including the four control units 10-1 to 10-4 has the two address bits as the specification area. That is, the system including 2m pieces of the control units 10 has m pieces of address bits as the specification area.

Therefore, even when the specification area is estimated, by taking account a situation that other address bits exists in the specification area, the estimation unit 21 repeatedly performs the processing (ii) and the processing (iii) while n is increased in a range of n where the measurement is carried out.

As the estimation unit 21 repeatedly performs the processing (ii) and the processing (iii) while n is increased in the range of n where the measurement is carried out, the estimation unit 21 may estimate the locations of all the address bits set in the address information without depending on the number of the control units 10 included in the system 1'. In other words, it may be mentioned that through the processing (ii) and the processing (iii), from the plurality of measurement results on the performances of the x2n width access, the estimation unit 21 may estimate the specification area where the plurality of address bit addresses are set.

It may be noted that in a case where the specification area is confirmed in the processing (iii), after the specification area is confirmed, in the address information for performing the discontinuous access generated by adding the address addition pattern at the time of the measurement on the performances of the respective x2n width accesses, the estimation unit 21 does not fix the values of the address bits equivalent to the estimated specification area to "0". That is, when it is estimated whether or not another specification area exists, the estimation unit 21 does not fix the values of the area that are already estimated as the specification area. For example, in the above-mentioned case, when it is estimated whether or not another specification area exists, the estimation unit 21 modifies the values of the address bits that are already estimated as the specification area to alternately generate "0" and "1" each time the address information is generated, so that the fixture of the values of the address bits that are already estimated as the specification area is suppressed.

In this manner, in a case where one bit of the address information is estimated as the specification area and thereafter the estimation of another specification area is further carried out, the estimation unit 21 generates a plurality of addresses so that the values of the bits that are already estimated as the specification area alternately have 0 and 1.

According to this, when the address addition pattern is added and the address information is generated, as the values of the bits that are already estimated as the specification area are not fixed to "0", in the measurement on the performance of the respective x2n accesses since the specification area is estimated, the control unit corresponding to the estimated specification area is not selected in a fixed manner.

Hereinafter, by using FIG. 6D and FIG. 6E, an addition pattern corresponding to another access width which is added to the address information when the estimation unit 21 performs the discontinuous access in the processing (ii) will be described.

In the example at the time of the x4 width access illustrated in FIG. 6D, with respect to the arbitrary address information as the reference, the estimation unit 21 sequentially adds a predetermined bit value "100000(2)(0×20)" as the address addition pattern at the time of the discontinuous access and fixes the values of the address bits 4 to 0 that are the lower 5 bits as the partial area in the relevant address information to "0".

It may be noted that as the estimation unit 21 increases the addition pattern at a time when the discontinuous access is carried out by 2 bits with respect to the address addition pattern at a time when the continuous access is executed, n becomes 2. Therefore, it may be mentioned that the plurality of addresses generated by the estimation unit 21 have x4 (=22) access width as compared with the plurality of addresses generated when the continuous access is executed.

Then, to carry out the discontinuous access, the estimation unit 21 generates a plurality of addresses by sequentially adding the address addition pattern amount corresponding to the x4 access width with respect to the arbitrary 8-byte address information as the reference and executes the discontinuous access by using the plurality of relevant generated addresses.

In this manner, the estimation unit 21 continuously executes the access in which the access width is 32 bytes in the example illustrated in FIG. 6D and measures the performance at the x4 width access.

In the example at the time of the x8 width access illustrated in FIG. 6E, with respect to the arbitrary address information as the reference, the estimation unit 21 sequentially adds a predetermined bit value "1000000(2)(0×40)" as the address addition pattern at the time of the discontinuous access and fixes the values of the address bits 5 to 0 that are the lower 6 bits as the partial area in the relevant address information to "0".

It may be noted that when the discontinuous access is carried out, the estimation unit 21 increases 3 bits with respect to the address addition pattern at a time when the continuous access is executed, and therefore n becomes 3. Therefore, it may be mentioned that the plurality of addresses generated by the estimation unit 21 have x8 (=23) access width as compared with the plurality of addresses generated when the continuous access is executed.

Then, to carry out the discontinuous access, the estimation unit 21 sequentially adds the address addition pattern corresponding to the x8 access width with respect to the arbitrary 8-byte address information as the reference to generate a plurality of addresses and executes the discontinuous access by using the plurality of relevant generated addresses.

In this manner, the estimation unit 21 continuously executes the access in which the access width is 64 bytes in the example illustrated in FIG. 6E and measures the performance at the x8 width access.

It may be noted that in the example illustrated in FIG. 6E, when the estimation unit 21 adds the address addition pattern to the address information, the value of the address bit 5 that is the specification area is fixed to "0". At this time, as illustrated in FIG. 3, the access from the processing unit 20 to the storage unit 30 is fixed to the control unit 10-1, and the load is concentrated on the control unit 10-1, so that the decrease in the performance of the system 1' occurs.

As described above, to investigate a border of the address range of the storage unit 30 where the respective control units 10 allocated to the access to the storage unit 30 illustrated in FIG. 4 are switched, to elaborate, a location of the specification area, the estimation unit 21 generates an address while fixing the bit one by one from the lower bits and performs an access to the storage unit 30.

Hereinafter, the border of the address range of the storage unit 30 where the respective control units 10 allocated to the access to the storage unit 30 are switched is also referred to as interleaving border.

After that, similarly, the estimation unit 21 measures the performance when the x2n width access is carried out in a case where n is larger than or equal to 4 (up to the most significant bit of the address of the storage unit 30).

It may be noted that when n is set as 60, to elaborate, in a case where an address width in which the most significant bit of the address of the storage unit 30 is "1" and the lower bits are "0" is used, at a time point when the access addition pattern is added for the second time, an overflow is generated in the address of the storage unit 30.

Also, as described above, to avoid the load concentration on the particular control unit with respect to the access to the address of the storage unit 30 where the use frequency is high and the areas are continuous, the system 1' sets a relatively lower address bit in which a possibility that the area where the addresses are continuous includes the specification area is high as the specification area and carries out the load dispersion like interleaving. In other words, a possibility is low that the specification area is a relatively higher address bit in which a possibility is low that the area where the addresses are continuous includes the specification area.

Therefore, the estimation unit 21 desirably generates an address where the address bit in a range suitable to the scale of the system 1' that is the verification target is fixed and accesses the storage unit 30 to measure the performance at the time of the storage unit access.

For example, in a case where continuous data in the vicinity of 8 Mbytes is dealt with as the maximum data amount demanded by the system 1' in the short term on the basis of a cache capacity of the CPU as the processing unit 20, it is conceivable that the system 1' performs the load dispersion by plural times with respect to the access request to the relevant continuous data. At this time, in the above-mentioned example, as the address of the storage unit 30 has a 64-bit (8-byte) length, in a case where an access is made to the continuous data of in the vicinity of 8 Mbytes, approximately 220 pieces of addresses are provided. Therefore, in a case where an 20-digit address is necessary, to perform the load dispersion at least once with respect to the access request to the relevant continuous data by the system 1', it is possible to estimate that the specification area exists between the address bit 3 and the address bit 23 of the address information.

Therefore, the estimation unit 21 desirably sets the bits from the address bit 3 of the address information to a predetermined address bit in accordance with the configuration of the system 1', in the above-mentioned example, the address bit 23 as the targets and decides the range where the x2n width access is carried out. In this case, n becomes 1 to 21.

It may be noted that the above-mentioned information such as the cache capacity of the CPU as the processing unit 20, the size of the continuous data as the maximum data amount demanded by the system 1' in the short term, or the range of n may be held in the storage unit 30 in advance.

Also, the number of addition of the address addition pattern to the reference address for generating the addresses at the time of the above-mentioned respective x2n width accesses by the estimation unit 21, in other words, the number of pieces of the address information to be generated may be set as a value obtained by dividing the size of the total data pieces that become the access targets at the time of the respective x2n width accesses by the register size.

For example, the size of the total data pieces that become the access targets at the time of the above-mentioned x2n width access is set as 32 Kbytes. In this case, the estimation unit 21 adds the address addition pattern to the reference address by 4096 (approximately 4000) times which is obtained by dividing 32 Kbytes by 8 bytes (64 bits) that is the register size on the architecture of the system 1'.

Herein, the size of the total data pieces that become the access targets in a case where the respective x2n width accesses are carried out is a size of the total data pieces to be written in the accesses and/or a size of the total data pieces to be read in the accesses, and in the processing (iii) which will be described below, the size is desirably a sufficient size in which the performance measurement may be performed in the respective x2n width accesses.

It may be noted that a reason why the size of the total data pieces that become the access targets at the time of the respective x2n width accesses is set to be constant is that the measurement on the decrease in the performance at the time of the storage unit access by the change in the access width of the address becomes facilitated by aligning conditions on the total capacity of the data used for the accesses. In this manner, in a case where the accesses are made by changing the access width by using the data of the same size, the estimation unit 21 identifies in which address width the performance decrease in the predetermined range occurs and estimate the specification area on the basis of the identified address width.

Also, as described above, in a case where n is set as 1 to 21 and the number of addition of the address addition pattern to the reference address by the estimation unit 21 is set as 4096 (approximately 4000) at the time of the x2n width access, approximately 4 Gbytes are respectively prepared for the areas of the storage units 30 allocated with respect to the respective processing units 20.

That is, as the estimation unit 21 executes the maximum x220 width access and performs the accesses to the 4096 addresses at that time, the storage area of the storage unit 30 accessed by the processing unit 20 has 220 bytes×4096=approximately 4 Gbytes at a maximum when the x220 width access is executed. Therefore, in a case where the measurement on the performance of the system 1' is carried out in the estimation unit 21 on the above-mentioned premise, the system 1' desirably allocates the area of the storage unit 30 having approximately 4 Gbytes for each of the processing units 20.

It may be noted that in the example illustrated in FIGS. 6A to 6E, the estimation unit 21 fixes the value of the partial area in the address information to "0", but the configuration is not limited to this, and the estimation unit 21 may also fix the value to "1".

Also, in the above-mentioned processing (ii), the estimation unit 21 sequentially increases n from 1 in the x2n width accesses and executes the respective x2n width accesses to measure the performance at that time, but the configuration is not limited to this, and the respective x2n width accesses may be executed while an arbitrary n is selected.

Finally, with reference to FIG. 7, FIG. 8, and FIG. 9, the processing (iii) will be described.

Figure 7:
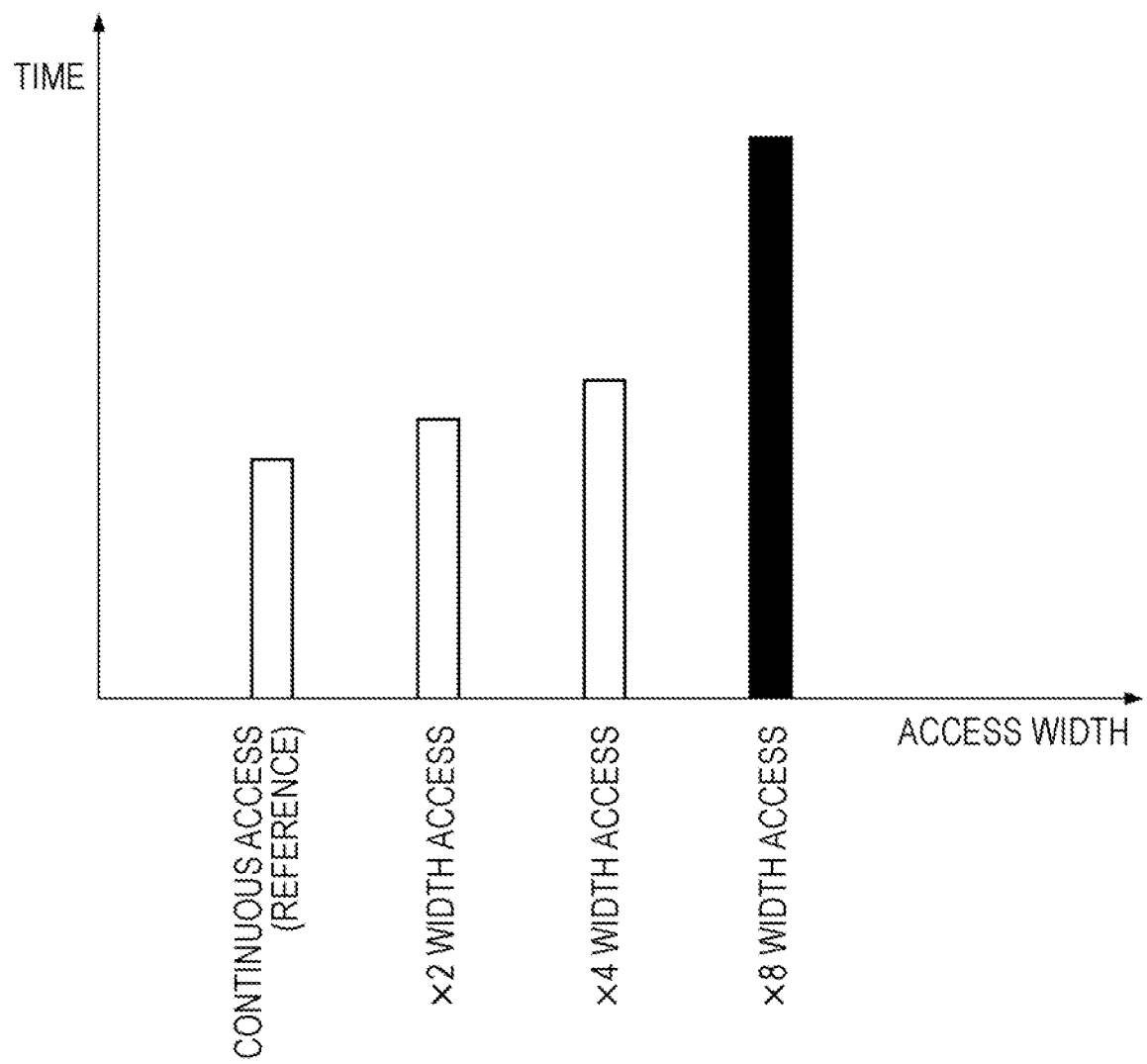
FIG. 7 illustrates a performance of the system based on the access of the estimation unit according to the first embodiment.

FIG. 7 illustrates a performance of the system 1' based on the access of the estimation unit 21 according to the first embodiment.

Figure 8:
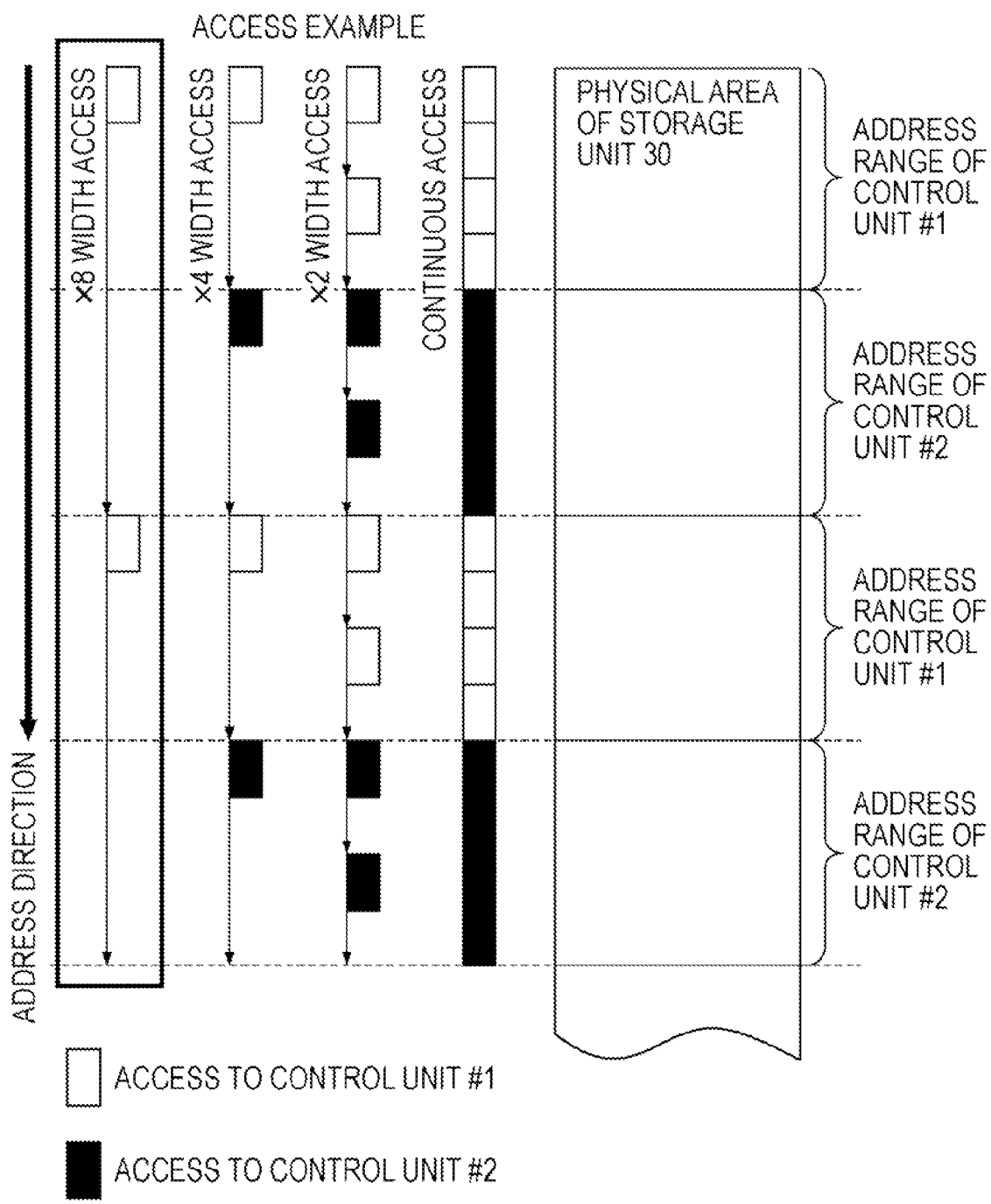
FIG. 8 illustrates an operation of the control unit based on an access of the estimation unit according to the first embodiment.

FIG. 8 illustrates an operation of the control unit 10 based on the access of the estimation unit 21 according to the first embodiment.

Figure 9:
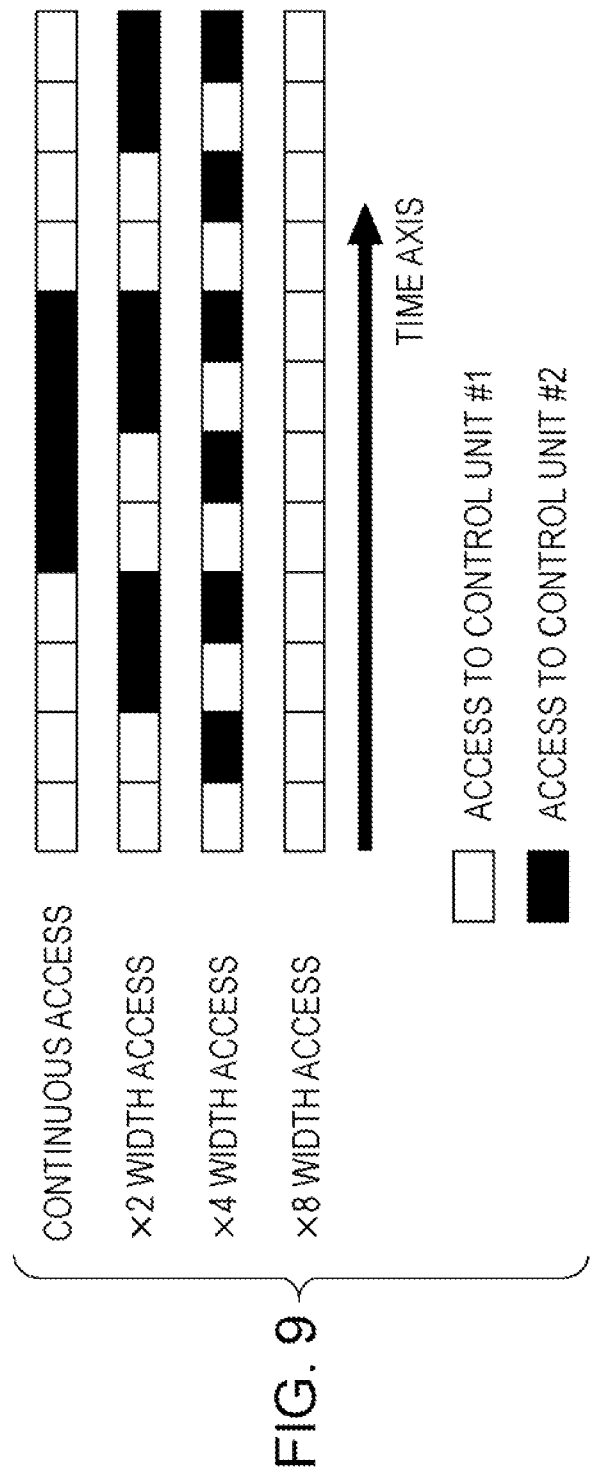
FIG. 9 illustrates an access count per unit time with respect to the control unit by the estimation unit according to the first embodiment.

FIG. 9 illustrates an access count per unit time with respect to the control unit 10 by the estimation unit 21 according to the first embodiment.

Once the performance of the system 1' when the discontinuous access is executed in the above-mentioned processing (ii) is measured, the estimation unit 21 compares the measured performance with the performance as the reference measured in the above-mentioned processing (i) and determines whether or not the performance decreased amount at the time of the discontinuous access from the performance as the reference is within a predetermined range.

Hereinafter, the discontinuous access at a time when the estimation unit 21 determines that the decreased amount from the performance as the reference belongs within the predetermined range is referred to as estimation target.

When it is determined that the decreased amount from the performance as the reference belongs within the predetermined range, the estimation unit 21 identifies the relevant discontinuous access as the estimation target and estimates the address bit fixed when the x2n width accesses that are the estimation targets are executed as the specification area.

First, the estimation unit 21 compares the performance by the continuous access as the reference (access time) with one measured performance by the x2n width access (access time).

In the example illustrated in FIG. 7, the access time in the x2 width access and x4 width access is smaller than a time obtained by multiplying the access time in the continuous access by 1.5 times. On the other hand, the access time in the x8 width access is twice or larger than the access time in the continuous access. To elaborate, the performance of the x8 width access is decreased by approximately 50% with respect to the performance of the continuous access.

FIG. 8 illustrates a relation between the storage area of the storage unit 30 accessed by the estimation unit 21 and the allocation of the control unit 10 in the storage area of the storage unit 30.

In the example illustrated in FIG. 8, a block in the respective access examples represents to one access size. According to the present embodiment, the block in the respective access examples has 8 bytes.

As illustrated in FIG. 8, one of the control units 10 is allocated for every address range of the storage unit 30.

The width of this address range is decided on the basis of the location of the specification area as described above. In the example illustrated in FIG. 3, the address bit 5 assigned with "C" is a bit where the control unit 10 is allocated.

In the example illustrated in FIG. 3, when the value of the address bit 5 is "0", the system 1' allocates the access from the processing unit 20 to the storage unit 30 to the control unit 10-1. On the other hand, when the value of the address bit 5 is "1", the system 1' allocates the access from the processing unit 20 to the storage unit 30 to the control unit 10-2.

When a reference is made to FIG. 8, in the accesses from the continuous access to the x4 width access, the accesses are generated to both the control units 10-1 and 10-2, but in the x8 width access, the accesses are regularly concentrated on the one control unit 10-1.

FIG. 9 illustrates the control units 10 allocated to the storage area of the storage unit 30 accessed by the estimation unit 21 illustrated in FIG. 8 along a time axis for each access example.

When a reference is made to FIG. 9, in the accesses from the continuous access to the x4 width access, no change is observed in the access count in the respective control units 10 per predetermined period of time. On the other hand, in the x8 width access, if the accesses are concentrated on the control unit 10-1, the access count is doubled with respect to the access count in the control unit 10-1 per predetermined period of time from the continuous access to the x4 width access.

As described above, as illustrated in FIG. 8, if the accesses are concentrated on the control unit 10-1 on the basis of the x8 width access where the access width exceeds the border of interleaving, as illustrated in FIG. 9, the access count is approximately doubled with respect to the access count of the control unit 10-1 in the continuous access. At this time, as illustrated in FIG. 7, the performance of the x8 width access where the access width exceeds the border of interleaving is decreased by 50% as compared with the performance of the continuous access.

Herein, an indication of the performance decrease of the x2n width access where the accesses are concentrated on the one control unit with respect to the performance of the continuous access as the reference is in the vicinity of approximately 40% to 70%.

It may be noted that as the estimation unit 21 may not recognize the access situation to the control unit 10 as described above, the control unit 10 illustrated in FIG. 8 and FIG. 9, but the performance measurement result illustrated in FIG. 7 may be obtained on the basis of the x2n width access.

Therefore, when the performance measurement result of the x2n width access illustrated in FIG. 7 described above is obtained, on the basis of the relation illustrated in FIG. 7, FIG. 8, and FIG. 9 described above, the estimation unit 21 may estimate the access situation in which the x8 width access where the performance decrease occurs, for example, by approximately 40% to 70% with respect to the performance of the continuous access is fixed to one control unit illustrated in FIG. 8 and FIG. 9.

To elaborate, when the performance measurement result of the x2n width access illustrated in FIG. 7 described above is obtained, the estimation unit 21 identifies the x8 width access as the estimation target.

Then, the estimation unit 21 estimates that the address bit 5 where the value at a time when the x8 width access of the estimation target is executed is fixed to "0" is the specification area.

That is, as illustrated in FIG. 6A, FIG. 6B, FIG. 6C, FIG. 6D, and FIG. 6E, the value of the most significant bit in the address addition pattern at the time of the x8 width access is 1 and the values of the other bits are all 0, and therefore the estimation unit 21 estimates the bit of the address information corresponding to the location of the next bit after most significant bit in the address addition pattern used when the performance of the x8 width access of the estimation target is measured as the specification area.

Also, as a result of the investigation on the performance of the measured one x2n width access, in a case where the estimation target may be identified and the specification area is estimated, the estimation unit 21 stores the information on the location of the estimated specification area in the storage unit 30 or the like.

Then, the estimation unit 21 changes the value of n and performs the processing (ii) again to measure the performance of another x2n width access. At this time, as described above, in the processing (ii), the estimation unit 21 generates a plurality of addresses so that the values of the address bits in the previously estimated specification area alternately have "0" and "1".

It may be noted that even in a case where the plurality of address bit addresses is set as the specification area, in the above-mentioned processing (iii), on the basis of whether or not the performance at the time of the x2n width access is decreased within a predetermined range from the reference performance, the estimation unit 21 may estimate the specification area.

For example, in the system 1" already described by using FIG. 5, in a case where the value of the address bit 5 is "0", the access from the processing unit 20 to the storage unit 30 is allocated to the control unit 10-1 or 10-3. On the other hand, in a case where the value of the address bit 5 is "1", the access from the processing unit 20 to the storage unit 30 is allocated to the control unit 10-2 or 10-4.

In a case where the target of the apparatus verification is the above-mentioned system 1", in the processing (ii), when the estimation unit 21 measures the performance of the x8 width access, as the estimation unit 21 fixes the value of the address bit 5 of the generated address information to "0", the accesses allocated to the four control units 10-1 to 10-4 are allocated to the two control units 10-1 and 10-3.

Therefore, in the system 1" in the example illustrated in the FIG. 5, when the estimation unit 21 executes the x8 width access where the access width exceeds the border of interleaving, the accesses allocated to the four control units 10-1 to 10-4 at the time of the continuous access are concentrated on the two control units 10-1 and 10-3. At this time, the access count in the x8 width access has a double of the access count with respect to the access count of the control units 10-1 and 10-3 in the continuous access. To elaborate, also in the system 1" in the example illustrated in the FIG. 5, as illustrated in FIG. 7, the performance of the x8 width access where the access width exceeds the border of interleaving is decreased by approximately 50% with respect to the performance of the continuous access.

From the above description, even in a case where the plurality of address bit addresses are set as the specification area, in the above-mentioned processing (iii), on the basis of whether or not the performance at the time of the x2n width access is decreased within a predetermined range from the reference performance, the estimation unit 21 may identify the plurality of x2n width accesses as the estimation target. Then, the estimation unit 21 may estimate the specification area from the plurality of identified x2n width access of the estimation target.

For example, in a case where the target of the apparatus verification is the above-mentioned system 1", the estimation unit 21 may identify the x8 width access as the estimation target and estimate the address bit 5 as the specification area and also may identify the x128 width access as the estimation target and estimate the address bit 9 as the specification area.

It may be noted that a predetermined range in which the performance decrease at a time when the estimation unit 21 determines the x2n width access exceeding the border of interleaving is, for example, a range in which the performance decrease from the reference performance is in the vicinity of approximately 40% to 70%. According to this, in the x2n width access where the performance decrease in the vicinity of approximately 40% to 70% from the reference performance occurs among the respective x2n width accesses, the estimation unit 21 may determine that the access width exceeds the border of interleaving.

Also, as described above, the indication of the performance decrease of the x2n width access where the accesses are concentrated on the one control unit with respect to the performance of the continuous access as the reference is the range in the vicinity of approximately 40% to 70%, and the estimation unit 21 identifies the x2n width access at the time of the performance decrease in the vicinity of approximately 40% to 70% from the performance as the reference as the estimation target. That is, it is conceivable that a factor for generating the accesses concentrated on the control unit 10 exists in the address width of the x2n width access at the time of the performance decrease in the vicinity of approximately 40% to 70% from the performance as the reference.

However, for example, in a case where the x2n width access in which the performance decrease from the reference performance is larger or equal to approximately 80% is generated, other than the access width of the x2n width access at this time, another factor for decreasing the performance of the system 1' may exist.

In view of the above, the estimation unit 21 estimates that the abnormality of the system 1', for example, the abnormality or failure of the control unit 10 occurs, and the estimation unit 21 may be configured to remind that effect.

In this manner, the estimation unit 21 generates the plurality of addresses in the plurality of x2n width accesses where the value of the bit at an arbitrary location in the address information is fixed, accesses the storage unit by using the generated addresses, measures the performance of the system 1', and estimates the specification area on the basis of the performance measurement results in the respective x2n width accesses and the location of the bit in which the value is fixed in the respective x2n width accesses.

Hereinafter, a function of the verification unit 22 of the system 1' illustrated in FIG. 2 in a case where the load verification for concentrating the load on the particular control unit 10 is carried out will be described. The function as the verification unit 22 is realized as the processing unit 20 executes the apparatus verification program installed in the storage unit 30 or the like. To elaborate, the operation of the verification unit 22 is carried out at a timing when the load verification (the load examination) is performed.

The verification unit 22 accesses the storage unit 30 to concentrate the load on the particular control unit 10 on the basis of the specification information that is set in the specification area estimated by the estimation unit 21 and verifies an apparatus quality in a high load state of the system 1'.

The verification unit 22 measures the performance of the system 1' by performing, for example, the following processings (iv) and (v). (iv) A plurality of addresses are randomly generated, and the plurality of generated addresses are sorted on the basis of the value of the specification area estimated by the estimation unit 21. (v) An access verification is carried out on the sorted plurality of addresses.

First, with reference to FIG. 10, the processing (iv) will be described.

Figure 10:
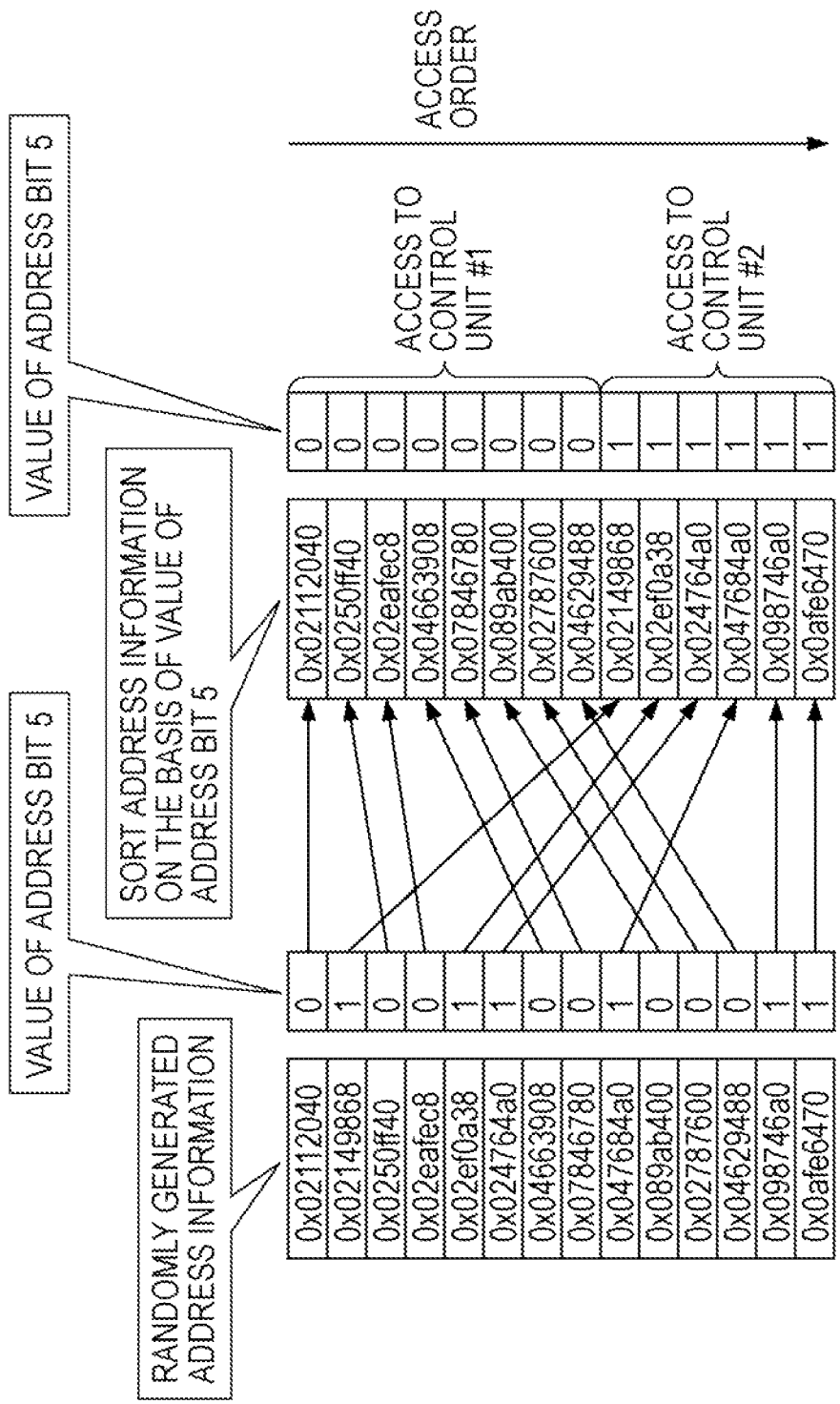
FIG. 10 illustrates address information generated by a verification unit according to the first embodiment.

FIG. 10 illustrates the address information generated by the verification unit 22 according to the first embodiment.

As illustrated in a column on a left end of FIG. 10, the verification unit 22 randomly generates the plural pieces of address information.

Herein, in the above-mentioned operation of the estimation unit 21, the size of the total data pieces that are the access targets at the time of the respective x2n width accesses is decided as 32 Kbytes, but the size of the total data pieces accessed by the verification unit 22 for performing the measurement at the time of the access is different from the one decided in the above-mentioned operation of the estimation unit 21, and the size may be set in a range permitted by the area of the storage unit 30 as the data for obtaining the measurement result on the performance of the system 1'.

Therefore, the number of pieces of address information generated by the verification unit 22 may be set as a value obtained by dividing the size of the total data pieces to be measured by the register size.

It may be noted that as described above, in the system 1', when the accesses are generated from the plurality of processing units 20 to the same address of the storage unit 30, on the basis of the reference to the cache memory of the respective processing units 20, the order assurance by the control unit 10, the hold-up of the access requests in the storage unit 30, and the like, the load with respect to the control unit 10 is decreased.

Therefore, in a case where the load verification for concentrating the load on the particular control unit 10 is carried out, to increase the load with respect to the particular control unit 10, the verification units 22-1 and 22-2 desirably generate a plurality of addresses where areas of the storage unit mutually different from the other verification unit 22 are set as the targets.

Each time the processing of by verification unit 22 is carried out, with respect to the respective processing units 20, the area of the storage unit 30 related to the processing of by the relevant verification unit 22 may be allocated on the basis of the program for performing the performance measurement and the like. However, the configuration is not limited to this, and the program for performing the performance measurement and the like may be allocated with respect to the respective processing units 20, the area of the storage unit 30 related to the verification collectively when the measurement of the performance of the system 1' is started.

For this reason, the respective verification units 22 generates an address list including the plural pieces of address information for the access with respect to the areas of the storage unit 30 mutually different from the other verification unit 22.

Next, the respective verification units 22 sorts a plurality pieces of address information generated by the respective verification units 22 on the basis of the value of the specification area estimated by the estimation unit 21.

For example, in the example illustrated in FIG. 10, in a case where the address bit 5 is the specification area, the verification unit 22 changes the order of the plural pieces of address information randomly generated in the respective verification units 22 while the value of the address bit 5 is set as a key.

According to this, each of the respective estimation units 22 may generate the address list for performing load concentration accesses with respect to the respective control units 10 from the randomly generated plural pieces of address information.

Herein, the load concentration access refers to an access in a mode of accessing the storage unit 30 by using the address list in which the plurality of addresses generated by the respective verification units 22 are sorted on the basis of the value of the specification area estimated by the estimation unit 21.

It may be noted that the plural pieces of address information illustrated in FIG. 10 are a part of the plural pieces of address information randomly generated by the verification unit 22. For example, the verification unit 22 generates the number of pieces of address information equivalent to the number obtained by dividing a size of sufficient data in which the performance measurement result of the system 1 may be obtained by the register size.

Herein, as described above with reference to FIG. 5, in a case where the plurality of address bit addresses exist in the address information as the specification area, the respective verification units 22 sorts the plural pieces of address information while all the address bits as the specification area are set as the targets.

For example, in the example of the system 1" illustrated in the FIG. 5, the respective verification units 22 sorts the plural pieces of address information while the value of the address bit 9 and the value of the address bit 5 are set as keys. That is, in the example illustrated in FIG. 10, with regard to the randomly generated address information, a reference is made to the value of the address bit 5, but in the system 1", furthermore, a reference is also made to the value of the address bit 9, and sorting of the plural pieces of address information is carried out while the value of the address bit 9 and the value of the address bit 5 are set as the keys.

In this case, the address lists includes, for example, the plural pieces of address information sorted into state in which the value of the address bit 9 and the value of the address bit 5 are both "0", next, the value of the address bit 9 is "1" and also the value of the address bit 5 is "0", next, the value of the address bit 9 is "0" and also the value of the address bit 5 is "1", and finally, the value of the address bit 9 and the value of the address bit 5 are both "1".

At this time, when the verification unit 22 performs the load concentration accesses by using the sorted address list, it is possible to concentrate the load on the control units 10-1, 10-3, 10-2, and 10-4 in the stated order.

It may be noted that the order of the sorting with respect to the address list by the verification unit 22 may be either the ascending order or the descending order of the values of the address bits that are the specification area.

Also, in a case where a plurality of address bits that are the specification area exist in the address, the order is not limited to the ascending order or the descending order of the values of the address bits that are the specification area, and other orders may also be employed. The other orders include, for example, a state in which the value of the address bit 9 and the value of the address bit 5 are both "0", next, the value of the address bit 9 and the value of the address bit 5 are both "1", next, the value of the address bit 9 is "1" and also the value of the address bit 5 is "0", and finally, the value of the address bit 9 is "0" and also the value of the address bit 5 is "1" or the like in the example of the system 1" illustrated in the FIG. 5.

At this time, when the verification unit 22 performs the load concentration accesses by using the sorted address list, it is possible to concentrate the load on the control unit 10-1, 10-4, 10-2, and 10-3 in the stated order.

In this manner, by changing the order of the sorting with respect to the address list, the verification unit 22 may arbitrarily change the order of applying the load on the control units 10 in the system 1'. Therefore, by changing the order of the sorting with respect to the address list, the verification unit 22 may improve a coverage of the access pattern to the storage unit 30.

Finally, with reference to FIG. 11A, FIG. 11B, FIG. 12A, FIG. 12B, FIG. 13A, FIG. 13B, and FIG. 14, the processing (v) will be described.

The respective verification units 22 sequentially reads the address information from the leading address information of the address list generated in the processing (iv), respectively, and accesses the area corresponding to the relevant address information of the storage unit 30.

FIGS. 11 to 13 illustrate accesses by the verification unit 22 according to the first embodiment.

In the example illustrated in FIGS. 11 to 13, the verification units 22-1 and 22-2 sequentially access the area corresponding to the relevant address information of the storage unit 30 from the leading address information of the respectively generated address list. Also, arrows respectively directing from the processing units 20-1 and 20-2 toward the control units 10-1 and 10-2 in the system 1' represent the control unit at the access destinations of the respective processing units 20 (the respective verification units 22).

It may be noted that FIG. 11A and FIG. 11B illustrate an example of a state in which the respective verification units 22 access the address of the storage unit corresponding to the address information at the fifth position among the address lists generated by the respective verification units 22. In the example illustrated in FIG. 11A and FIG. 11B, an access destination of the processing unit 20-1 and an access destination of the processing unit 20-2 are both the control unit 10-1.

FIG. 12A and FIG. 12B illustrate an example of a state in which the respective verification units 22 access the address information at the seventh position among the address lists generated by the respective verification units 22. In the example illustrated in FIG. 12A and FIG. 12B, the access destination of the processing unit 20-1 is the control unit 10-1, and the access destination of the processing unit 20-2 is the control unit 10-2.

Figures 13A, 13B:
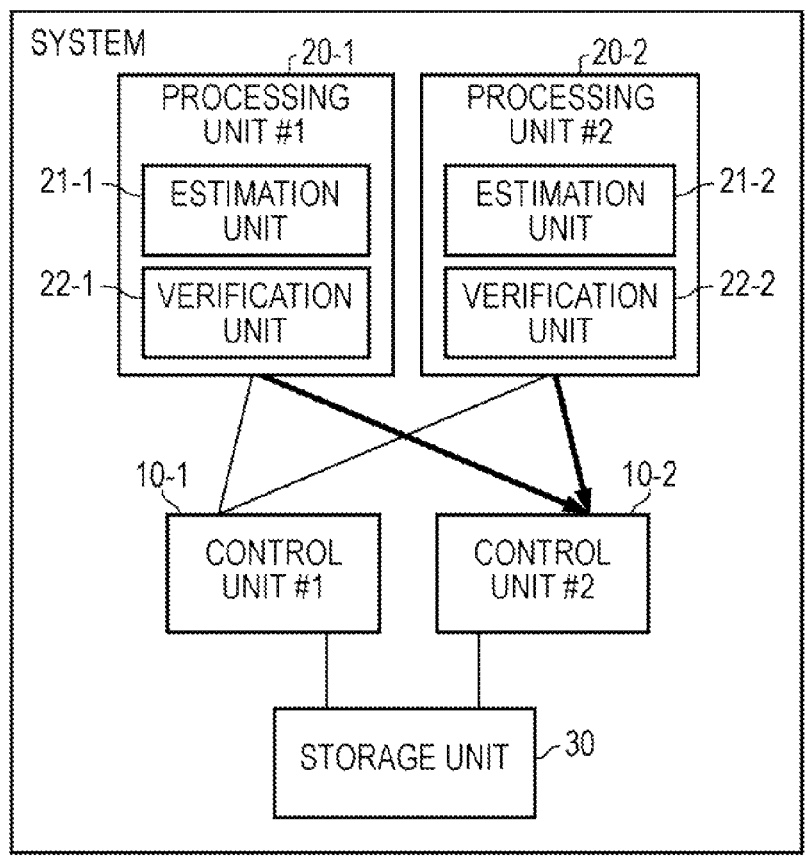
FIG. 13A and FIG. 13B illustrate the load concentration accesses by the verification units according to the first embodiment.

FIG. 13A and FIG. 13B illustrate an example of a state in which the respective verification units 22 access the address information at the eleventh position among the address lists generated by the respective verification units 22. In the example illustrated in FIG. 13A and FIG. 13B, the access destination of the processing unit 20-1 and the access destination of the processing unit 20-2 are both the control unit 10-2.

Herein, a reference is made to FIGS. 11 to 13, the address lists respectively generated by the verification units 22-1 and 22-2 have mutually different ratios of the address information corresponding to the control unit 10-1 and the address information corresponding to the control unit 10-2.

This is because the respective verification units 22 respectively randomly generate the plural pieces of address information, and the value of the specification information set in the specification area of each generated address information is randomly decided as "0" or "1".

It may be noted that similarly, as described in FIG. 10 above, the address information of the address lists illustrated in FIGS. 11 to 13 is a part among the address information of the address lists generated by the respective verification units 22, and the address lists includes more pieces of address information than those illustrated.

FIG. 14 illustrates a load situation generated in the system 1' according to the first embodiment when the respective verification units 22 access the respective control units in accordance with the order of the addresses on the address lists respectively illustrated in FIGS. 11 to 13.

In FIG. 14, a solid line assigned with A represents a load generated in the control unit #1 (the control unit 10-1) in the apparatus verification by the respective verification units 22, to elaborate, an access count to the control unit #1. A broken line assigned with B represents a load generated in the control unit #2 (the control unit 10-2) in the apparatus verification by the respective verification units 22, to elaborate, an access count to the control unit #2.

Also, a dotted line assigned with C represents a conceptual load wave generated in the system 1' (the control unit 10) which is represented on the basis of the solid line A and the broken line B.

In FIG. 14, t0 denotes a timing when the respective verification units 22 start the apparatus verification on the basis of the respective address lists. t1 denotes a timing when the load generated in the control unit 10-1 of the system 1' becomes peak. t2 denotes a timing when a load is generated in the control unit #2 (the control unit 10-2) in the apparatus verification by the respective verification units 22. t3 denotes a timing when the load is no longer generated in the control unit #1 (the control unit 10-1) in the apparatus verification by the respective verification units 22. t4 denotes a timing when the load generated in the control unit 10-2 of the system 1' becomes peak.

Hereinafter, with reference to FIGS. 11 to 13, the example illustrated in FIG. 14 will be described.

When the respective verification units 22 start the apparatus verification on the basis of the respective address lists (in FIG. 14, t0), the addresses are read out from the lead of the respective address lists to carry out the accesses. In the example illustrated in FIG. 11A and FIG. 11B, the verification units 22-1 and 22-2 both perform the access to the control unit 10-1 (in FIG. 14, which corresponds to a period between t0 and t2).

At this time, in the system 1', the load represented by the solid line A of FIG. 14 is generated, and the load of the control unit 10-1 becomes peak at the timing t1. Herein, in the load represented by the solid line A, a reason why the load of the control unit 10-1 becomes at the timing t1 is that, as illustrated in FIG. 11A and FIG. 11B, the accesses are performed from the respective verification units 22 to the control unit 10-1 from the timing t0, and in the control unit 10-1, the processing gradually backlogs, and the load is accumulated.

Also, in the load represented by the solid line A, a reason why the load of the control unit 10-1 gradually decreases between t1 and t2 is that as illustrated in FIG. 12A and FIG. 12B, the accesses from the verification units 22 to the control unit 10-1 are gradually shifted to the accesses from the verification units 22 to the control unit 10-2, and in the control unit 10-1, the backlogged processing gradually diminishes, and the load is decreased.

It may be noted that in the example illustrated in FIG. 14, curved lines of the solid line A and the broken line B have a more gentle inclination as the number of the processing units 20 provided to the system of the verification target, to elaborate, the number of the verification units 22 that performs the verification is larger. This is because, for example, as illustrated in FIG. 12A and FIG. 12B described above, for each of the verification units 22-1 and 22-2, a timing when the accesses to the control unit 10-1 are shifted to the accesses to the control unit 10-2 differs, and the loads on the respective control units 10-1 and 10-2 by the verification unit 22 are dispersed.

It may be noted that it is assumed that the respective verification units 22 perform the accesses up to the address at the sixth position of the respective address lists during a period until t2 illustrated in FIG. 14.

Next, in the example illustrated in FIG. 12A and FIG. 12B, the respective estimation units 22 perform the accesses to the addresses at the seventh position and the eighth position of the respective address lists.

At this time, the access from the processing unit #1 (the processing unit 20-1) to the storage unit 30 becomes the access to the control unit 10-1 as the specification information in the addresses at the seventh position and the eighth position of the respective address lists is "0".

On the other hand, the access from the processing unit #2 (the processing unit 20-2) to the storage unit 30 becomes the access to the control unit 10-2 as the specification information in the addresses at the seventh position and the eighth position of the respective address lists is "1".

In the example illustrated in FIG. 12A and FIG. 12B, the respective verification units 22 perform the accesses to the respective addresses at the seventh position and the eighth position of the respective address lists. The verification unit 22-1 accesses the control unit 10-1, and the verification unit 22-2 accesses the control unit 10-2 (in FIG. 14, which corresponds to a period between t2 and t3).

At this time, in the system 1', the loads illustrated in the solid line A and the broken line B of FIG. 14 are generated.

Then, in the example illustrated in FIG. 13A and FIG. 13B, the respective verification units 22 perform the access to the respective addresses at the ninth and subsequent positions of the respective address lists. As the values of the instruction areas of the addresses set at the ninth and subsequent positions of the respective address lists are all "1", the verification units 22-1 and 22-2 both perform the access to the control unit 10-2 (in FIG. 14, after t3).

At this time, in the system 1', the load represented by the broken line B of FIG. 14 is generated, and the load of the control unit 10-2 becomes peak at the timing t4. Herein, in the load represented by the broken line B, a reason why the load of the control unit 10-2 becomes peak at the timing t4 is that as illustrated in FIG. 12A, FIG. 12B, FIG. 13A, and FIG. 13B, after the timing t3, the accesses from both the verification units 22-1 and 22-2 are concentrated on the control unit 10-2, and in the control unit 10-2, the processing gradually backlogs, and the load is accumulated.

As described above, the respective verification units 22 perform the access to the storage unit 30 on the basis of the address stored in the respective address lists and switch the control unit 10 allocated to the relevant access, so that the transition state is generated in the load in the system 1'.

In this manner, the verification unit 22 sorts the plural pieces of generated address information by the respective verification units 22 on the basis of the value of the specification area estimated by the estimation unit 21, so that a bias of the specification information set in the specification area is generated in the respective pieces of address information of the address lists.

Therefore, as illustrated in FIG. 14, in a case where the load generated in the system 1' is observed in terms of the time axis, the peaks of the loads generated in the system 1' may be easily obtained (in FIGS. 14, t1 and t4).

Also, in the system 1', while the loads represented by the solid line A and the broken line B are generated respectively in the control units 10-1 and 10-2, as conceptually illustrated by the dotted line C in FIG. 14, the wave of the load situation may be displayed. It may be noted that the dotted line C is for adding the loads of the solid line A and the broken line B for the complementarily display, and an operator who performs the apparatus verification may use the display to satisfy the verification pattern in terms of loads. On the basis of the dotted line C, the operator may visually grasp the wave of the loads generated in the system 1' (the control unit 10).

Furthermore, in the address information, by putting the values in the area other than the specification area for deciding the allocation of the control units 10 in a random state, the verification unit 22 may access the storage unit by using the access patterns of the variety of addresses and may generate the maximum load with respect to the control unit 10.

As described above, the verification unit 22 randomly generates the plural pieces of address information, sorts the plural pieces of generated address information on the basis of the values of the specification information set in the specification area that is estimated by the estimation unit 21, performs the access with respect to the storage unit 30 on the basis of the plural pieces of sorted address information, and measures the performance of the system 1'.

Next, operations of the estimation unit 21 according to the first embodiment and the verification unit 22 will be described with reference to FIG. 15 and FIG. 16.

Figure 15:
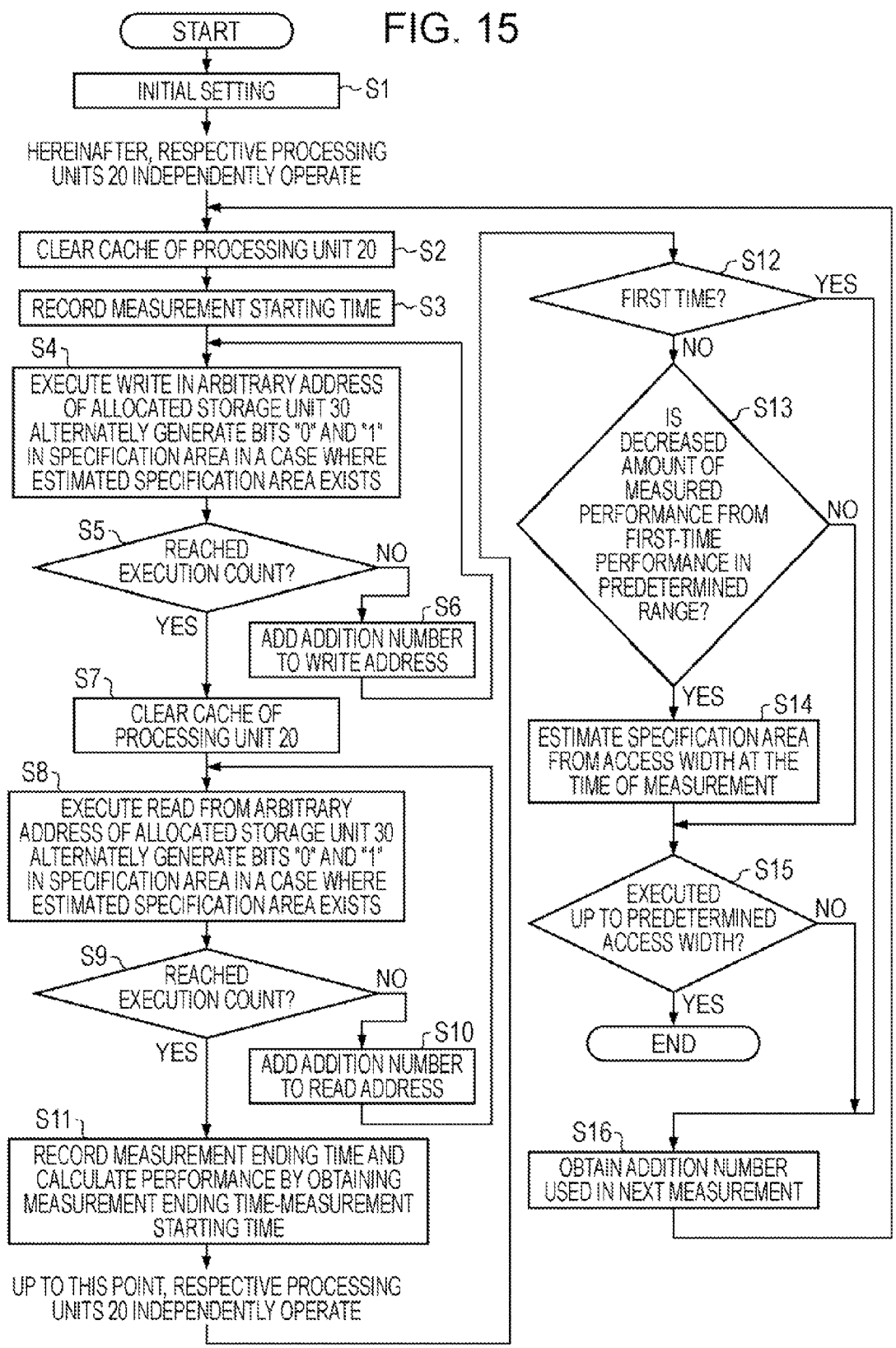
FIG. 15 is a flow chart for describing an operation of the estimation unit according to the first embodiment.

FIG. 15 is a flow chart for describing the operation of the estimation unit 21 in a case where the load verification of the system 1' is carried out in the system 1' illustrated in FIG. 2.

As the premise when the load verification of the system 1' is carried out, as described above, the address of the storage unit 30 has the 64-bit length, and the register size on the apparatus architecture of the system 1' is set as 8 bytes.

Also, the size of the total data pieces that become the access targets at the time of the continuous access and the x2n width access is set as 32 Kbytes.

First, the estimation unit 21 performs an initial setting for a processing of estimating the specification area (step S1).

At this time, the estimation unit 21 divides 32 Kbytes which is the size of the total data pieces that become the access targets by 8 bytes which is the register size to obtain an execution count of orders for accessing the storage unit (Count A).

Also, the estimation unit 21 prepares, for example, a value such as "1000(2)" as the address addition pattern (AddressAdder, addition number) corresponding to the access width for the register size.

Hereinafter, with regard to the respective processing to be described, the respective processing units 20 independently operate.

First, the respective estimation units 21 issues an order for initializing the caches of the respective processing units 20, and the caches of the respective processing units 20 are cleared (step S2).

According to this, as the information that becomes the address target of the storage unit 30 at the access destination exists in the cache of the processing unit 20, the control unit 10 may prevent the access destination of the relevant access from being directed toward the cache of the processing unit 20.

Next, by the respective estimation units 21, a starting time of the processing is recorded as a measurement starting time (step S3).

Then, the arbitrary address as the reference of the storage unit 30 allocated to the respective processing units 20 is generated by the respective estimation units 21, and with respect to the generated arbitrary address as the reference, the write of arbitrary data is executed (step S4).

Also, when the estimation unit 21 executes the write of the data, 1 is added to a data write count. It may be noted that the initial value of the data write count is 0.

It may be noted that in the arbitrary address as the reference, as described above with reference to FIG. 6A, FIG. 6B, FIG. 6C, FIG. 6D, and FIG. 6E, the values of the lower bits by the number of continuous bits of "0" in the address addition pattern are "0".

Herein, the processing in step S4 is included in a loop processing in steps S5 and S6 which will be described below. In a case where step S4 is executed through a loop from step S6, in step S4, the estimation unit 21 does not use the arbitrary address as the reference as the write address where the write of arbitrary data is executed but uses an address in which the addition number is added to the write address in step S6.

Also, in a case where the estimation unit 21 has already estimated the specification area, the estimation unit 21 modifies the values of the bits in the specification area of the write address so that "0" and "1" are alternately generated, and the values in the area already estimated as the specification area are not fixed. On the other hand, in a case where the specification area is not estimated by the estimation unit 21, with regard to the write address, the estimation unit 21 fixes the values of the lower bits by the number of continuous bits of "0" in the address addition pattern to "0".

When the write of the data to the storage unit in step S4 is ended, the respective estimation units 21 determine whether or not the data write count reaches the execution count (Count A) (step S5).

In a case where the respective estimation units 21 determine that the data write count does not reach the execution count (Count A) (step S5: No route), by the respective estimation units 21, the addition number corresponding to the address of the storage unit 30 where the access has been carried out beforehand, to elaborate, the access width is added to the write address to generate a new write address (step S6), the flow returns to the processing in step S4.

On the other hand, in a case where the respective estimation units 21 determine that the data write count reaches the execution count (Count A) (step S5: Yes route), by the respective estimation units 21, to initialize the caches of the respective processing units 20, a command of clearing the caches is issued, and the caches of the respective processing units 20 are cleared (step S7).

Next, the arbitrary address as the reference of the storage unit 30 allocated to the respective processing units 20 is generated by the respective processing units 21, and the read of the data written in the generated arbitrary address as the reference is executed (step S8).

Also, when the estimation unit 21 executes the data read, 1 is added to the data read count. It may be noted that the initial value of the data read count is 0.

It may be noted that in the arbitrary address as the reference, as described above with reference to FIG. 6A, FIG. 6B, FIG. 6C, FIG. 6D, and FIG. 6E, the values of the lower bits by the number of continuous bits of "0" in the address addition pattern are "0".

Herein, the processing in step S8 is included in a loop processing in steps S9 and S10 which will be described below. In a case where step S8 is executed through a loop from step S10, in step S8, the estimation unit 21 does not use the arbitrary address as the reference as the read address where the read of the arbitrary data is executed but use an address in which the addition number is added to the read address in step S10.

At this time, in a case where the estimation unit 21 has already estimated the specification area, the estimation unit 21 modifies the values of the bits in the specification area of the read address so that "0" and "1" are alternately generated, and the values in the area already estimated as the specification area are not fixed. On the other hand, in a case where the specification area is not estimated by the estimation unit 21, with regard to the read address, the estimation unit 21 fixes the values of the lower bits by the number of continuous bits of "0" in the address addition pattern to "0".

When the data read from the arbitrary address of the storage unit is ended, the respective estimation units 21 determine whether or not the number of data read reaches the execution count (Count A) (step S9).

In a case where the respective estimation units 21 determine that the data read count does not reach the execution count (Count A) (step S9: No route), the respective estimation units 21 adds the value equivalent to the access width to the address of the storage unit 30 that has previously performed the access to generate a new read address (step S10), and the flow returns to the processing in step S8.

On the other hand, in a case where the respective estimation units 21 determine that the data read count reaches the execution count (Count A) (step S9: Yes route), the respective estimation units 21 record a time at which the data write is ended as a measurement ending time (step S11).

At this time, the respective estimation units 21 calculate a value obtained by subtracting the measurement starting time from the measurement ending time as an access time in the access width where the measurement is carried out, to elaborate, a value representing the performance at the time of the access in the access width where the measurement is carried out.

Up to now, with regard to the described processing, the respective processing units 20 respectively independently operate. The subsequent processings may be carried out commonly by the respective processing units 20 or may also be carried out by only one of the processing units 20.

Next, the estimation unit 21 determines whether or not the processing carried out up to this point, to elaborate, the execution count of the series of processing from the start of the data write to the completion of the data read is the first time (step S12).

In a case where the estimation unit 21 determines that the processing execution count is the first time (step S12: Yes route), as the performance previously measured is the performance that becomes the reference by the continuous access, an evaluation on the measurement result is not carried out, and an access width used for the next measurement is obtained (step S16), so that the processing in step S2 and subsequent steps is carried out while the access width is changed.

On the other hand, in a case where the estimation unit 21 determines that the processing executed in the previous time is not for the first time (step S12: No route), it is determined as to whether or not a decreased amount of the performance measured in the previous time from the performance measured for the first time, to elaborate, the performance as the reference by the continuous access is within a predetermined range (step S13).

Herein, the predetermined range may be set, for example, as 40% to 70%.

Then, in a case where the estimation unit 21 determines that the decreased amount of the measured performance is within the predetermined range (step S13: Yes route), the specification area is estimated from the access width where the measured performance decrease amount is within the predetermined range (step S14).

On the other hand, in step S14, in a case where the estimation unit 21 determines that the decreased amount of the measured performance is not within the predetermined range (step S13: No route), the processing in step S14 is not executed, and the processing in the next step S15 is carried out.

When the estimation unit 21 estimates the specification area in step S14 or when it is determined that the decreased amount of the performance is not within the predetermined range in step S13, the estimation unit 21 determines whether or not the measurement up to a predetermined access width is executed (step S15).

Herein, the predetermined access width is set, for example, as the address bit 23.

Next, in a case where the estimation unit 21 determines that the measurement up to the predetermined access width is not executed (step S15: No route), the estimation unit 21 obtains the access width used in the next measurement (step S16), and the flow returns to the processing in step S2.

On the other hand, in a case where the estimation unit 21 determines that the measurement up to the predetermined access width is executed (step S15: Yes route), the estimation unit 21 determines that the processing for the estimation of the specification area is ended, and the processing by the estimation unit 21 is ended.

Herein, as described above, the access to the storage unit by the respective estimation units 21 in steps S4 to S10 is carried out while the respective estimation units 21 perform the write with respect to the address of the storage unit 30 and thereafter the written value is read.

According to this, as the estimation unit 21 may estimate the specification area from the respective processings of write and read, the reliability for the estimation of the specification area by the estimation unit 21 may be improved as compared with a case in which the specification area is estimated from the performance by the process of only write or read.

At this time, the respective estimation units 21 may also hold the plurality of write addresses generated in steps S4 to S6 in the storage unit 30. According to this, the respective estimation units 21 do not generate the read address in steps S8 to S10. The respective estimation units use the plurality of write addresses held in the storage unit 30 or the like to access the storage unit and may read the value written in step S4.

It may be noted that the data write to the storage unit 30 by the processing unit 20 is carried out in an asynchronous manner with respect to the storage unit 30. On the other hand, as the data read from the storage unit 30 by the processing unit 20 involves the processing of obtaining the data from the storage unit 30, the data read tends to receive an influence from the load in the control unit 10 as compared with the write processing.

Therefore, in a case where the performance of the processing unit 20 at the time of the storage unit access is measured, only the read processing from the address of the storage unit 30 by the processing unit 20 which is equivalent to steps S8 to S10 may be carried out.

Figure 16:
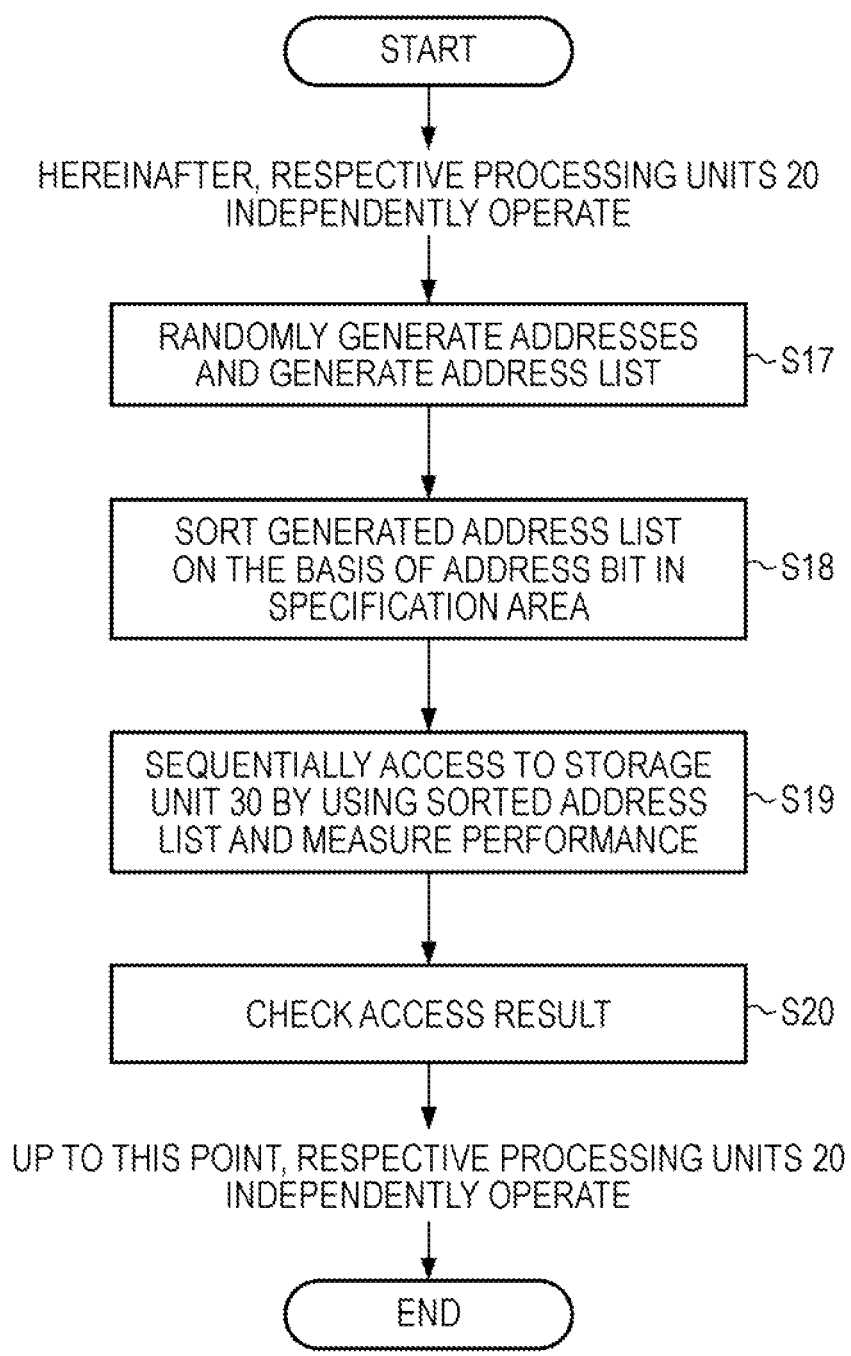
FIG. 16 is a flow chart for describing an operation of the verification unit according to the first embodiment.

FIG. 16 is a flow chart for describing the operation of the verification unit 22 in a case where the load verification of the system 1' is carried out in the system 1' illustrated in FIG. 2.

Hereinafter, with regard to the processing to be described, the respective processing units 20 respectively independently operate.

First, the respective verification units 22 randomly generate a plurality of addresses and generate an address list (step S17).

Next, the respective verification units 22 sorts the addresses in the generated address list while the address bit in the specification area estimated by the estimation unit 21 is set as a key (step S18).

At this time, the specification area exists in the plurality of address bit addresses, and the respective verification units 22 sort the plural pieces of address information while all the address bits as the specification area are set as the targets.

Then, the respective verification units 22 sequentially read the addresses from the sorted address list and perform the access with respect to the addresses of the storage unit 30 in order by using the read addresses to measure the performance (step S19).

Herein, like the address by the estimation unit 21 described with reference to FIG. 15, the accesses by the respective verification units 22 may be carried out while the write of the data is carried out with respect to the storage unit 30 and thereafter the written value is read from the storage unit.

Finally, the respective verification units 22 check the access result in step S19 (step S20), and the processing is ended.

Herein, as the check on the access result in step S19, for example, the respective verification units 22 confirm whether or not the value read from the address at the access destination in step S19 is matched with the expected value mutually through the comparison.

Up to now, with regard to the respective described processings, the respective processing units 20 respectively independently operate. A subsequent processing that is not illustrated in the drawing, for example, a processing such as an aggregation of the load verification results by the processing unit 20 or display may be carried out commonly by the respective processing units 20 or may also be carried out by only one of the processing units 20.

It may be noted that the respective processing units 20 respectively independently operate up to the processing in step S19, and the processing in step S20 may be carried out commonly by the respective processing units 20 or may also be carried out by one of the processing units 20.

In this manner, according to the first embodiment, the estimation unit 21 estimates the specification area in the address information, to elaborate, the address bit 5 of FIG. 3 or the address bits 5 and 9 of FIG. 5. Also, in the verification unit 22, on the basis of the specification information in the specification area estimated by the estimation unit 21, the control unit 10 to which the address is allocated is identified, and an access is made to the storage unit 30 while the load is provided to the individual control units 10 in a concentrated manner, so that the reliability at the time of the access concentration of the system or the high load is verified.

Therefore, in the system where the load dispersion is carried out between the plurality of control units 10, it is possible to provide the load to the individual control units 10, and the reliability of the load verification may be significantly improved.

Also, in the system whose apparatus configuration is unclear, the estimation unit 21 estimates the specification area as described above. Then, by the verification unit 22, the plurality of addresses are randomly generated, the plurality of generated addresses are sorted while following the specification information in the specification area estimated by the estimation unit 21, and the access is carried out with respect to the storage unit 30 on the basis of the plurality of sorted addresses, so that the reliability verification at the time of the high load in the system is carried out. According to this, as described above with reference to FIGS. 10 to 14, the verification unit 22 may provide the maximum load from the viewpoint of the unit of individual control units in the system whose apparatus configuration is unclear.

Furthermore, as described above with reference to FIGS. 10 to 14, the verification unit 22 generates the wave of the load situation by transiting the load state from the viewpoint of the entire system (see the dotted line C of FIG. 14), and it is possible to improve the verification coverage in terms of load in the apparatus to be verified.

In the above, the embodiments have been described in detail, but the technique is not limited to the relevant particular embodiment. The technique may be executed through various modifications and alterations within a range without departing from the gist of the embodiments.

Figure 17:
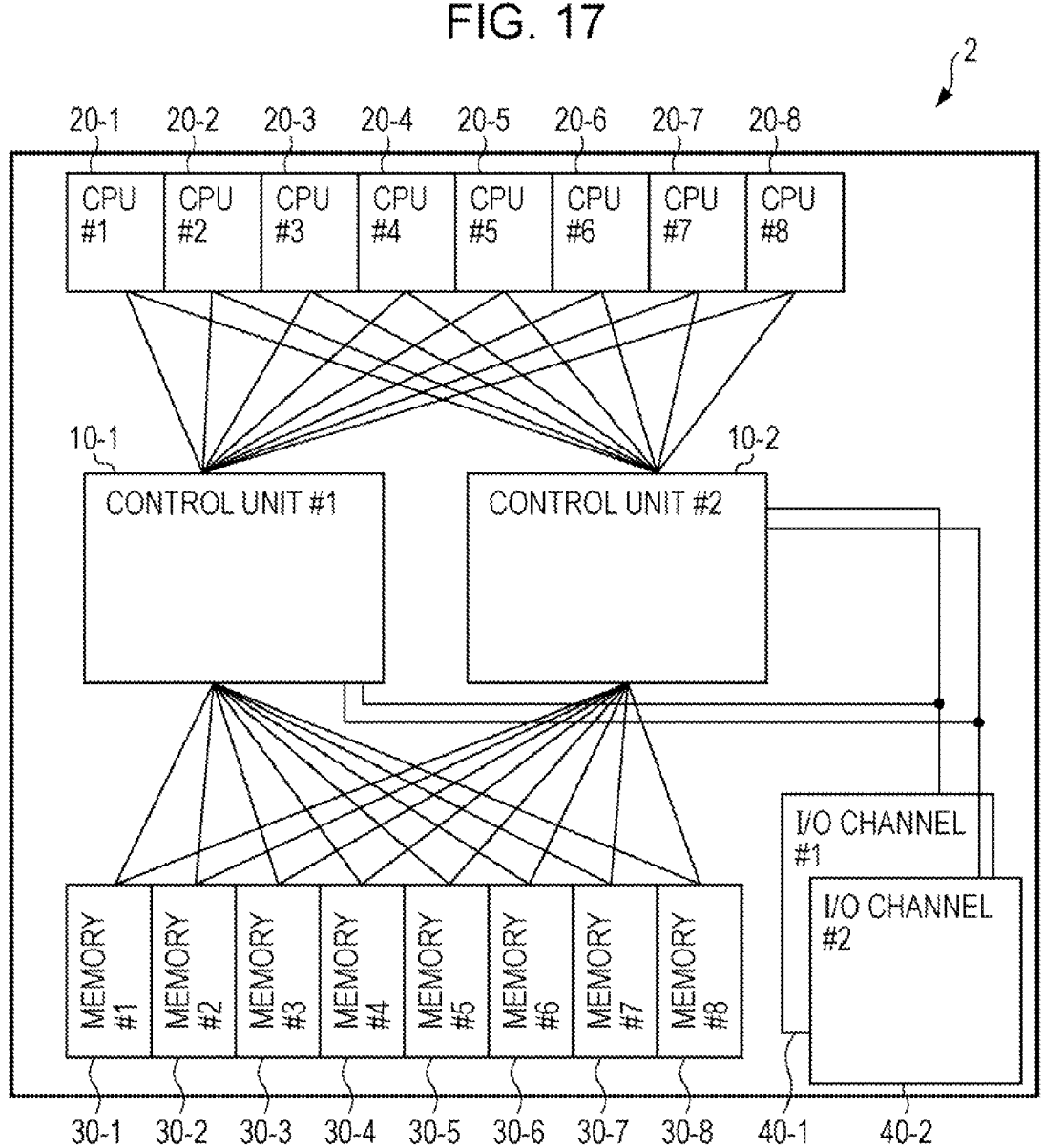
FIG. 17 is a block diagram of a configuration example of another system.
Figure 18:
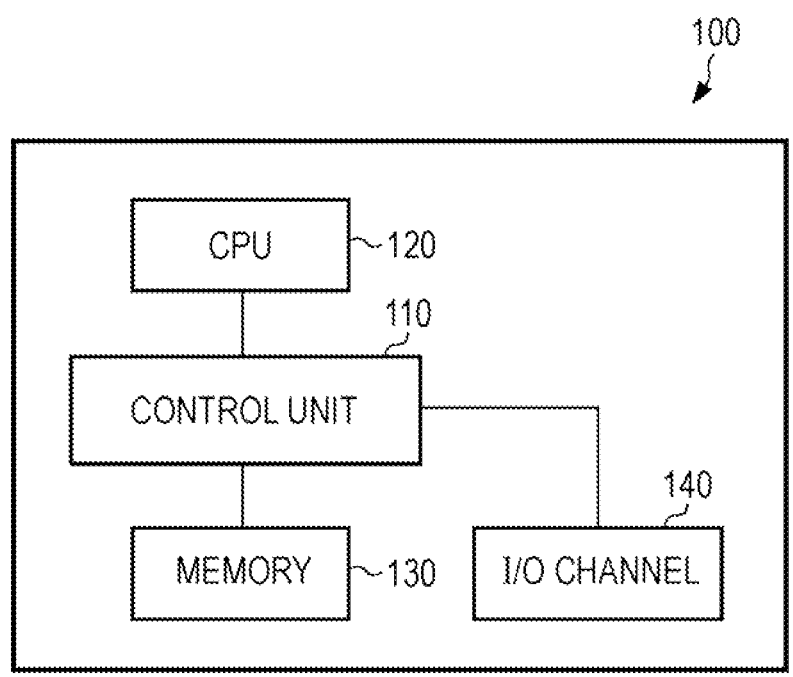
FIG. 18 is a block diagram of a configuration example of a general information processing system.

FIG. 17 is a block diagram of a configuration example of another system 2.

For example, as described with reference to FIG. 17, the number of the processing units 20 in the system 1' or 1" according to the first embodiment is 2, but the number of processing units is not limited to this. As the processing unit 20, 3 or more, in the example illustrated in FIG. 17, eight CPUs 20-1 to 20-8 may be provided. Also, as the processing unit 20, plural, in the example illustrated in FIG. 17, two I/O channels 40-1 and 40-2 may be provided. Furthermore, as the storage unit 30, two or more, in the example illustrated in FIG. 17, eight memories 30-1 to 30-8 may be provided.

In the example illustrated in FIG. 17, the control units 10-1 and 10-2 are respectively connected to the memories 30-1 to 30-8, and the control unit 10-2 is connected to the memories 30-5 to 30-8.

In the system 2, the load dispersion is carried out between the control units so that accesses are not concentrated on one of the control units 10-1 and 10-2 on the basis of access requests to the storage areas of the memories 30-1 to 30-8 by the CPUs 20-1 to 20-8.

Also, in the system 2, the load dispersion is carried out between the control units so that accesses are not concentrated on one of the control units 10-1 and 10-2 on the basis of access requests to the storage areas of the memories 30-1 to 30-8 by I/O channels 40-1 and 40-2.

In the above-mentioned system 2 also, it is possible to carry out the above-mentioned load verification according to the first embodiment.

Also, the above-mentioned method for the performance measurement is not only applied to the above-mentioned load verification with respect to the control units but also may similarly be applied to a load verification with respect to a memory controller that is provided between the CPU and the memory and is adapted to perform memory interleaving.

Furthermore, the above-mentioned system performance measurement may be carried out, for example, by a performance measurement apparatus via an I/O channel provided to a system of the verification target while accesses are made to the plurality of control units and the storage unit. In this case, the estimation unit 21 and the verification unit 22 are provided to the performance measurement apparatus.

It may be noted that functions as the estimation unit 21 and the verification unit 22 described above are realized while a computer (including a CPU, an information processing apparatus, and various terminals) executes a predetermined application program as the apparatus verification program.

The program is provided, for example, in a mode to be recorded on a computer-readable recording medium such as a flexible disk, a CD (a CD-ROM, a CD-R, a CD-RW, or the like), or a DVD (a DVD-ROM, a DVD-RAM, a DVD-R, a DVD-RW, a DVD+R, a DVD+RW, or the like). In this case, the computer reads a storage unit control program from the recording medium and transfers the program to an internal storage apparatus or an external storage apparatus to be stored and used. Also, the program may be recorded on a storage apparatus (recording medium) such as, for example, a magnetic disk, an optical disk, or an opto-magnetic disk and provided to the computer from the storage apparatus via a communication line.

Herein, the computer refers to a concept including hardware and an OS (operation system) and means the hardware operating under a control of the OS. Also, in a case where the OS is not necessary and the hardware is operated by the application program alone, the hardware itself is comparable to the computer. The hardware is provided with at least a micro processor such as a CPU and means for reading the computer program recorded in the recording medium.

The application program as the above-mentioned apparatus verification program includes program codes for causing the above-mentioned computer to realize the above-mentioned functions. Also, a part of the functions may be realized by the OS instead of the application program.

All examples and conditional language recited herein are intended for pedagogical purposes to aid the reader in understanding the embodiment and the concepts contributed by the inventor to furthering the art, and are to be construed as being without limitation to such specifically recited examples and conditions, nor does the organization of such examples in the specification relate to a illustrating of the superiority and inferiority of the embodiment. Although the embodiments of the present inventions have been described in detail, it should be understood that the various changes, substitutions, and alterations could be made hereto without departing from the spirit and scope of the invention.

What is claimed is:

1. A computer-readable, non-transitory medium storing a program for measuring a performance in a system including a storage and a plurality of controllers, the program causing a computer to execute a process, the process comprising:
    estimating a specification area for address information including an address area in which an address of an access target in the storage is set and an information area in which specification information for specifying a first controller to control an access to the access target from among the plurality of controllers is set; and
    verifying a reliability of the system by accessing the storage based on the specification information in the specification area.

2. The computer-readable, non-transitory medium according to claim 1,
    wherein the estimating includes
    generating a plurality of addresses based on a plurality of states in which a value of the address information is fixed in different partial areas, respectively,
    measuring a performance of the system by respectively accessing the plurality of addresses generated by the generating in each state, and
    estimating the specification area based on the performance measurement result and the different partial areas in each state.

3. The computer-readable, non-transitory medium according to claim 2, wherein
    the verifying includes
    randomly generating a plurality of address information,
    sorting the plurality of address information generated by the randomly generating based on the specification information, and
    accessing the plurality of addresses generated by the generating based on the plurality of address information sorted by the sorting.

4. The computer-readable, non-transitory medium according to claim 2, wherein
    the estimating includes
    specifying a performance measurement result of a first state from among the plurality of the states as an estimation target when the performance measurement result of the first state is decreased with respect to a reference performance measurement result, and
    estimating the specification area based on the partial area in the address information used when measuring the performance of the estimation target.

5. The computer-readable, non-transitory medium according to claim 4, wherein the performance measurement result of the first state is specified as the estimation target when the amount of the performance measurement result decreased from the reference performance measurement result falls within a specified range.

6. The computer-readable, non-transitory medium according to claim 5, wherein
    the estimating includes estimating that an abnormality of the system occurs when the decreased amount of the performance measurement result exceeds the specified range.

7. The computer-readable, non-transitory medium according to claim 1, wherein
    the estimating includes
    generating the plurality of addresses based on a plurality of states in which values of bits within the address information are fixed from the values of the lower bits in a specified order,
    measuring the performance of the system by accessing the storage based on the plurality of addresses generated by the generating, and
    estimating the specification area based on the performance measurement result in each state and a location of the bits in the address generated by the generating where the values of bits are fixed.

8. The computer-readable, non-transitory medium according to claim 7, wherein
    the estimating includes
    generating the plurality of addresses by sequentially adding a specified bit value to a reference address, the specified bit value being fixed in a respective state.

9. The computer-readable, non-transitory medium according to claim 8, wherein the estimating includes
    specifying the performance measurement result of a first state from among the plurality of the states as an estimation target in case that the performance measurement result of the first state is decreased with respect to the reference performance measurement result, and
    the specification area is estimated based on the specified bit value which is used when measuring the performance measurement result of the estimation target specified by the specifying.

10. The computer-readable, non-transitory medium according to claim 9, wherein
    the most significant bit of the specified bit is "1" and the values of the other bits are all "0", and
    the estimating includes
    estimating one bit in the address information as the specification area, the one bit corresponding to a location of a next bit after most significant bit, the next bit being used when measuring the performance of the estimation target.

11. The computer-readable, non-transitory medium according to claim 10, wherein
    the estimating includes
    generating the plurality of addresses while suppressing a fixture of the value of a bit which is estimated as the specification area when the bit in the address information as the specification area is estimated.

12. The computer-readable, non-transitory medium according to claim 7, wherein
    the accessing includes mutually changing an access width corresponding to each state.

13. A method of verifying a system including a storage and a plurality of controllers, the method comprising:
    estimating a specification area for address information including an address area in which an address of an access target in the storage is set and an information area in which specification information for specifying a first controller to control an access to the access target from among the plurality of controllers is set; and
    verifying a reliability of the system by accessing the storage based on the specification information in the specification area.

14. The method according to claim 13, wherein
    the estimating includes generating a plurality of addresses based on a plurality of states in which value of the address information is fixed in different partial areas, respectively, measuring a performance of the system by respectively accessing the plurality of addresses generated by the generating in each state, and estimating the specification area based on the performance measurement result and the different partial areas each state.

15. The method according to claim 14, wherein the verifying includes randomly generating a plurality of address information, sorting the plurality of address information generated by the randomly generating based on the specification information, and accessing the plurality of addresses generated by the generating based on the plurality of address information sorted by the sorting.

16. A performance measurement apparatus for measuring a performance in a system including a storage and a plurality of controllers, the measuring performance apparatus comprising:

a memory; and a processor coupled to the memory and configured to:

estimate a specification area for address information including an address area in which an address of an access target in the storage is set and an information area in which specification information for specifying a first controller to control an access to the access target among the plurality of controllers is set, and verify a reliability of the system by accessing the storage based on the specification information.

17. The performance measurement apparatus according to claim 16, wherein the processor is configured to access to the plurality of controllers and the storage via an Input/Output channel included in the system.

* * * * *